(12) United States Patent
Kondo et al.

(10) Patent No.: US 7,406,025 B2
(45) Date of Patent: *Jul. 29, 2008

(54) OPTICAL INFORMATION RECORDING MEDIUM, AND SUBSTRATE AND MANUFACTURING METHOD FOR THE OPTICAL INFORMATION RECORDING MEDIUM

(75) Inventors: Tetsuya Kondo, Kanagawa-ken (JP); Eiji Nakagawa, Kanagawa-ken (JP); Hirofumi Nagano, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 98 days.

This patent is subject to a terminal disclaimer.

(21) Appl. No.: 11/434,782

(22) Filed: May 17, 2006

(65) Prior Publication Data
US 2006/0227697 A1 Oct. 12, 2006

Related U.S. Application Data

(63) Continuation of application No. 11/157,857, filed on Jun. 22, 2005, now Pat. No. 7,072,285, which is a continuation of application No. 09/695,866, filed on Oct. 26, 2000, now Pat. No. 6,930,977.

(30) Foreign Application Priority Data

Nov. 25, 1999 (JP) ............................ 11-334098
Dec. 1, 1999 (JP) ............................ 11-341821

(51) Int. Cl.
*G11B 7/24* (2006.01)

(52) U.S. Cl. ............... 369/275.4; 369/275.3; 369/288
(58) Field of Classification Search ... 369/275.1–275.5, 369/44.13, 44.29, 53.41, 47.22, 47.28, 277, 369/278, 279, 288, 286, 53.2, 53.11
See application file for complete search history.

(56) References Cited

U.S. PATENT DOCUMENTS

| | | | |
|---|---|---|---|
| 6,343,062 B1 | 1/2002 | Furukawa et al. | |
| 6,582,793 B2 | 6/2003 | Kondo | |
| 6,744,725 B2 | 6/2004 | Kondo | |
| 6,925,050 B2 | 8/2005 | Kondo | |
| 6,930,977 B1 | 8/2005 | Kondo et al. | |
| 7,072,285 B2 * | 7/2006 | Kondo et al. ............ | 369/275.4 |
| 7,088,670 B2 * | 8/2006 | Kondo .................... | 369/275.4 |

FOREIGN PATENT DOCUMENTS

| | | |
|---|---|---|
| JP | 07-044873 A | 2/1995 |
| JP | 11-086345 | 3/1999 |

* cited by examiner

*Primary Examiner*—Ali Neyzari
(74) *Attorney, Agent, or Firm*—Connolly Bove Lodge & Hutz LLP

(57) ABSTRACT

In an optical disk including at least a rewritable phase change material and comprising a recording layer having a reflectivity of more than 15%, an address output value as an address pit signal component occupying in a reproduced signal in a non recording state is prescribed to be 0.18 though 0.27 or a numerical aperture of an address pit signal occupying in a reproduced signal in a non recording state is prescribed to be more than 0.3.

4 Claims, 19 Drawing Sheets

OPTICAL INFORMATION RECORDING MEDIUM, AND SUBSTRATE AND MANUFACTURING METHOD FOR THE OPTICAL INFORMATION RECORDING MEDIUM

CROSS REFERENCE TO RELATED APPLICATIONS

This application is a Continuation of application Ser. No. 11/157,857 filed Jun. 22, 2005 (allowed), which is a Continuation of application Ser. No. 09/695,866, filed on Oct. 26, 2000 (now U.S. Pat. No. 6,930,977), and for which priority is claimed under 35 U.S.C. § 120; and this application claims priority of Application No. 11-334098 filed in Japan on Nov. 25, 1999, and Application No. 11-341821 filed in Japan on Dec. 1, 1999, under 35 U.S.C. § 119; the entire contents of all are hereby fully incorporated by reference.

BACKGROUND OF THE INVENTION

1. Field of the Invention

The present invention relates to an optical information recording medium being utilized for a recording and reproducing apparatus or a drive, which records an information in the optical information recording medium with moving the medium relatively and reads out the information from the medium, and a substrate and a manufacturing method for the optical information recording medium, particularly, relates to an optical information recording medium, which can be recorded and reproduced in a high density and a large capacity, and a substrate and a manufacturing method for the optical recording medium.

2. Description of the Related Art

Currently, there existed a system, which can optically record and reproduce information by using a disk shaped medium, as a system of an information recording medium for reading out information with moving the medium relatively. A disk system medium can be divided into several types such as a read only type or a ROM (read only memory) type, a recordable or a write once type or an "R" type and a rewritable type or a RW type. Generally, a recording density of a medium is high in a ROM type and low in "R" and RW types. For instance, in a DVD (digital versatile disk) system, which utilizes a laser beam having a wavelength of 635 through 650 nm, introduced into the market in 1996, a read only type disk such as a DVD-ROM disk and a DVD-Video disk was introduced first. A recording capacity of a read only type DVD disk is 4.7 GB. On the other hand, a recording capacity of a rewritable type DVD disk such as a DVD-RAM (DVD-Random Access Memory) disk is 2.6 GB, that is, the recording capacity of a DVD-RAM disk is almost 55% of that of a DVD-ROM disk. Researches and developments for increasing a recording capacity of a rewritable type disk are progressing. However, a system having a same capacity as that of a DVD-ROM disk has not been developed yet.

In the case of a rewritable type disk, a recording format on a disk and materials of recording medium are key technologies. In a DVD-RAM disk, a land-groove recording method, which is utilized for recording information on both land and groove of an optical information recording medium, has been used. In this method, an address necessary to recording and reproducing is recorded with cutting a land and a groove at each specific period of time.

FIG. 19 is a fragmentary plan view of a disk partially enlarging a microscopic construction 20, that is, a physical format construction of the land-groove recording method disk. In FIG. 19, the drawing shows an external appearance of the construction when the disk is not recorded and grooves 21a through 21c, hereinafter represented by the groove 21, are formed in parallel to each other. Lands 22a and 22b, hereinafter represented by the land 22, are allocated in between the grooves. An information is recorded on both the groove 21 and the land 22 when recording. A plurality of address pits 23a through 23n, which is necessary to recording and reproducing, is formed by cutting the groove 21 and land 22. The addresses occupy an area 24 in conjunction with an accompanied signal, so that the area 24 prevents a total capacity of a disk from increasing. In other words, a limited area of a disk can not be effectively utilized because of the area 24.

Further, with respect to recording material, in consideration of interchangeability with a read only type DVD disk drive, a phase change recording method, which does not utilize a magnetic head, is suitable. However, this method is defective in reflectivity, which is much inferior to a read only type disk or a write once type disk of utilizing dye. Accordingly, the low reflectivity results in that a recording capacity can not be increased.

By combining a microscopic construction or a physical format construction with a phase change material for high density recording and by optimizing them, a recording capacity equivalent to that of a read only type DVD disk can be realized.

An optical disk, which records addresses with scattering over a disk without having an inherent address area such as the area 24 shown in FIG. 19, is considered as a format for a large capacity optical disk. In other words, an address area such as the area 24 is not provided, so that a recording capacity can be increased as many as that of a DVD-ROM disk. However, in a case that a main recording signal is recorded in a vicinity area of an address signal, the main recording signal may interfere in the address signal and an error may occur by this method, and then rewriting can not be performed any more. Conversely, the address signal may leak into and interfere in the main recording signal and result in a reading out error.

SUMMARY OF THE INVENTION

Accordingly, in consideration of the above-mentioned problems of the prior art, an object of the present invention is to provide an optical information recording medium of a high density phase change type, that is, a recording disk, which can record and reproduce a main recording signal and an address signal without interfering in each other, particularly, to indicate an output range of an address signal for realizing the object and a dimension of a microscopic construction of such the address signal in detail.

Further, the high density phase change type medium is not limited to a DVD disk. Accordingly, dimensions of a microscopic construction are indicated in a general equation for being applied to a recording and reproducing apparatus, under developing, which utilizes a laser beam having a shorter wavelength.

Furthermore, another object of the present invention is to provide an optical information recording disk of a high density phase change type or a recording disk comprising both a recording/reproducing area and another area having a pit array for preventing the disk from illegal duplication and an address signal mentioned above so as to be able to record and reproduce with minimizing relative interference between a main recording signal and an address signal, moreover, so as to indicate a performance range of an address signal, wherein the address signal can be read out properly when the recording disk is not recorded, and a dimension of microscopic construction of the address signal in detail.

In order to achieve the above object, the present invention provides, according to a first aspect thereof, an optical information recording medium comprising: a substrate formed with an area having sinusoidally deflected grooves and address pits scattered and allocated between the grooves; a recording layer having reflectivity of more than 15% being composed of at least a rewritable phase change material; and a resin layer formed over said recording layer, the optical information recording medium is further characterized in that an output value of address pit as a signal component of address pit occupying in a reproduced signal under a not recorded condition in the area is within a range of 0.18 to 0.27.

According to a second aspect of the present invention, there provided an optical information recording medium comprising: a substrate formed with an area having sinusoidally deflected grooves and address pits scattered and allocated between the grooves; a recording layer having reflectivity of 18 through 30% being composed of at least a rewritable phase change material; and a resin layer formed over the recording layer, the optical information recording medium is further characterized in that an output value of address pit as a signal component of address pit occupying in a reproduced signal under a not recorded condition in the area is within a range of 0.18 to 0.27.

According to a third aspect of the present invention, there provided an optical information recording medium comprising: a substrate formed with an area having sinusoidally deflected grooves and address pits scattered and allocated between the grooves of which a track pitch TP is 0.74 µm; a recording layer having reflectivity of 18 through 30% being composed of at least a rewritable phase change material; and a resin layer formed over the recording layer, the optical information recording medium is further characterized in that an output value of address pit as a signal component of address pit occupying in a reproduced signal by using a pickup having a wavelength of a laser beam of 650 nm and a numerical aperture of 0.6 under a not recorded condition in the area is within a range of 0.18 to 0.27.

According to a fourth aspect of the present invention, there provided an optical information recording medium comprising: a substrate formed with an area having sinusoidally deflected pit arrays and address pits scattered and allocated between the pit arrays; a recording layer having reflectivity of more than 15% being composed of at least a rewritable phase change material; and a resin layer formed over the recording layer, the optical information recording medium is further characterized in that an output value of address pit as a signal component of address pit occupying in a reproduced signal under a not recorded condition in the area is more than 0.3.

According to a fifth aspect of the present invention, there provided an optical information recording medium comprising: a substrate formed with an area having sinusoidally deflected pit arrays and address pits scattered and allocated between the pit arrays; a recording layer having reflectivity of 18 through 30% being composed of at least a rewritable phase change material; and a resin layer formed over the recording layer, the optical information recording medium is further characterized in that an output value of address pit as a signal component of address pit occupying in a reproduced signal under a not recorded condition in the area is more than 0.3.

According to a sixth aspect of the present invention, there provided an optical information recording medium comprising: a substrate formed with an area having sinusoidally deflected pit arrays and address pits scattered and allocated between the pit arrays of which a track pitch TP2 is 0.74 µm; a recording layer having reflectivity of 18 through 30% being composed of at least a rewritable phase change material; and a resin layer formed over the recording layer, the optical information recording medium is further characterized in that an output value of address pit as a signal component of address pit occupying in a reproduced signal by using a pickup having a wavelength of a laser beam of 650 nm and a numerical aperture of 0.6 under a not recorded condition in the area is more than 0.3.

According to a seventh aspect of the present invention, there provided an optical information recording medium comprising: a substrate formed with an area having sinusoidally deflected grooves and address pits scattered and allocated between the grooves; a recording layer having reflectivity of more than 15% being composed of at least a rewritable phase change material; and a resin layer formed over the recording layer, the substrate is further characterized in that the area is provided with a microscopic construction being simultaneously satisfied by relationships among a groove depth "d", a groove width "w", a groove track pitch TP, an address pit length AL, a readout wavelength $\lambda$ and a substrate refractive index "n" in said area such as $0.05\lambda/n \leq d \leq 0.1\lambda/n$, $0.35 \leq w/TP \leq 0.55$, $0.18 < 0.14k + 4.11 \, n(d-26)/\lambda < 0.27$ and $k = AL/ML$.

According to an eighth aspect of the present invention, there provided an optical information recording medium comprising: a substrate formed with an area having sinusoidally deflected grooves and address pits scattered and allocated between the grooves; a recording layer having reflectivity of 18 through 30% being composed of at least a rewritable phase change material; and a resin layer formed over the recording layer, the substrate is further characterized in that the area is provided with a microscopic construction being simultaneously satisfied by relationships among a groove depth "d", a groove width "w", a groove track pitch TP, an address pit length AL, a readout wavelength $\lambda$ and a substrate refractive index "n" in the area such as $0.05\lambda/n \leq d \leq 0.1\lambda/n$, $0.35 \leq w/TP \leq 0.55$, $0.18 < 0.14k + 4.11 \, n(d-26)/\lambda < 0.27$ and $k = AL/ML$.

According to a ninth aspect of the present invention, there provided an optical information recording medium comprising: a substrate formed with an area having sinusoidally deflected grooves and address pits scattered and allocated between the grooves; a recording layer having reflectivity of 18 through 30% being composed of at least a rewritable phase change material; and a resin layer formed over the recording layer, the substrate is further characterized in that the area is provided with a microscopic construction being simultaneously satisfied by relationships among a groove depth "d", a groove width "w", a groove track pitch TP, an address pit length AL in the area such as TP=0.74 µm, $20 \leq d \leq 41$ nm, $0.26 \leq w \leq 0.41$ µm and $35AL+d<53$.

According to a tenth aspect of the present invention, there provided an optical information recording medium comprising: a substrate formed with an area having sinusoidally deflected pit arrays and address pits scattered and allocated between the pit arrays; a recording layer having reflectivity of more than 15% being composed of at least a rewritable phase change material; and a resin layer formed over the recording layer, the substrate is further characterized in that the area is provided with a microscopic construction being simultaneously satisfied by relationships among a pit depth "d2", a pit width "w2", a pit array track pitch TP2, an address pit length AL2, a readout wavelength $\lambda$ and a substrate refractive index "n" in the area such as $0.05\lambda/n \leq d2 \leq 0.1\lambda/n$, $0.35 \leq w2/TP2 \leq 0.55$, $0.18 < 0.14k + 4.11 \, n(d2-26)/\lambda < 0.27$ and $k = AL2/ML$.

According to an eleventh aspect of the present invention, there provided an optical information recording medium comprising: a substrate formed with an area having sinusoidally deflected pit arrays and address pits scattered and allocated between the pit arrays; a recording layer having reflectivity of 18 through 30% being composed of at least a rewritable phase change material; and a resin layer formed over the recording layer, the substrate is further characterized in that the area is provided with a microscopic construction being simultaneously satisfied by relationships among a pit depth "d2", a pit width "w2", a pit array track pitch TP2, an address pit length AL2, a readout wavelength $\lambda$ and a substrate refractive index "n" in the area such as $0.05\lambda/n \leq d2 \leq 0.1\lambda/n$, $0.35 \leq w2/TP2 \leq 0.55$, $0.18 < 0.14k + 4.11 n(d2-26)/\lambda < 0.27$ and $k = AL/ML$.

According to a twelfth aspect of the present invention, there provided an optical information recording medium comprising: a substrate formed with an area having sinusoidally deflected pit arrays and address pits scattered and allocated between the pit arrays; a recording layer having reflectivity of 18 through 30% being composed of at least a rewritable phase change material; and a resin layer formed over the recording layer, the substrate is further characterized in that the area is provided with a microscopic construction being simultaneously satisfied by relationships among a pit depth "d2", a pit width "w2", a pit array track pitch TP2, an address pit length AL2 in the area such as TP2=0.74 µm, $20 \leq d2 \leq 41$ nm, $0.26 \leq w2 \leq 0.41$ µm and $44 < 35AL2 + d2 < 53$.

According to a thirteenth aspect of the present invention, there provided a substrate for an optical information recording medium, which is formed with a first area having sinusoidally deflected grooves and address pits scattered and allocated between the grooves together with a second area having sinusoidally deflected pit arrays and address pits scattered and allocated between the pit arrays, the substrate is further characterized in that the first area is provided with a first microscopic construction being simultaneously satisfied by relationships among a groove depth "d", a groove width "w", a groove track pitch TP and an address pit length AL in the first area such as TP=0.74 µm, $20 \leq d \leq 41$ nm, $0.26 \leq w \leq 0.41$ µm and $44 < 35AL + d < 53$, and that the second area is provided with a second microscopic construction being simultaneously satisfied by relationships among a pit depth "d2", a pit width "w2", a pit track pitch TP2 and an address pit length AL2 in the first area such as TP2=0.74 µm, $20 \leq d2 \leq 41$ nm, $0.26 \leq w2 \leq 0.41$ µm and $44 < 35AL2 + d2 < 53$.

According to a fourteenth aspect of the present invention, there provided a manufacturing method for an optical information recording medium comprising steps of: vacuum filming a recording layer being composed of at least a rewritable phase change material on a substrate; and adhering a dummy substrate on said recording layer with sandwiching a resin layer between the recording layer and dummy substrate.

Other object and further features of the present invention will be apparent from the following detailed description when read in conjunction with the accompanying drawings.

DETAILED DESCRIPTION OF THE PREFERRED EMBODIMENTS

The present invention establishes a method, which is valid in a system utilizing a laser beam having a shorter wavelength of less than 600 nm, in conjunction with realizing a rewritable type optical disk having a higher recording capacity, that is, 4.7 GB equivalent to that of a read only type DVD (digital versatile disk) utilizing a laser beam for recording and reproducing having a wavelength of 635 through 650 nm.

Prior to depicting each embodiment of the present invention, details common to each embodiment are explained first.

Figure 1:
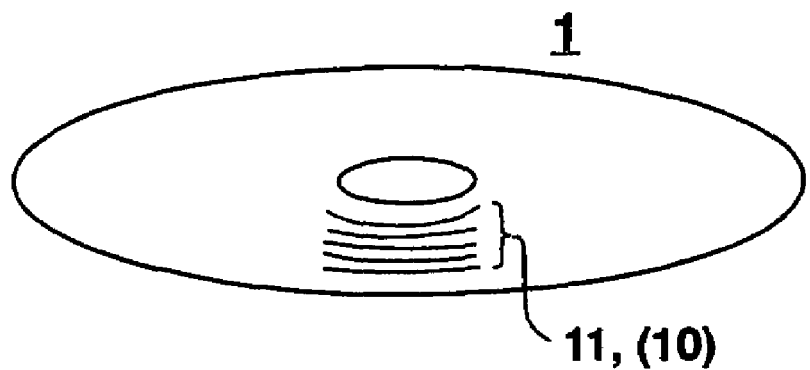
FIG. 1 is a perspective view of an optical information recording medium according to an embodiment of the present invention.

FIG. 1 is a perspective view of an optical disk as an optical information recording medium according to an embodiment of the present invention.

Figure 14:
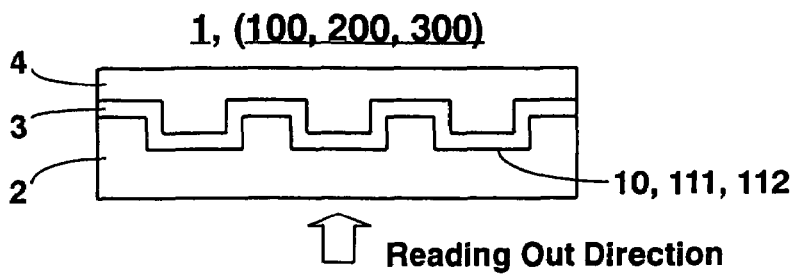
FIG. 14 is a cross sectional view of the optical disk shown in FIG. 1.

FIG. 14 is a cross sectional view of the optical disk shown in FIG. 1.

In FIG. 1, an optical disk 1 is a type of optical disk, which is recorded with information only in a groove 11. The groove 11 as an information track and an address pit, not shown, are embedded in the optical disk 1 coaxially or spirally and they form a microscopic construction 10. A cross sectional view of the optical disk 1 is shown in FIG. 14.

FIG. 14 shows a fundamental construction of an optical disk according to the embodiment of the present invention. In FIG. 14, the optical disk 1 comprises a substrate 2, a recording layer 3 and a resin layer 4 and they are laminated in order. Recording and reproducing information in the optical disk 1 by a light beam is performed toward the recording layer 3. It is defined arbitrarily that a laser beam having a wavelength of λnm, which is stopped down by a objective lens having a numerical aperture of NA, is irradiated on the recording layer 3 from either side of the optical disk 1. In other words, it is arbitrarily defined whether the laser beam is irradiated on a surface of the substrate 2 or the resin layer 4. A path for an incident light, that is, a light path has a certain refractive index "n" to the wavelength λ and an effective optical length of the light path is defined by the refractive index "n". In FIG. 14, the substrate 2 is illustrated as a light path for one example. The microscopic construction 10 including the groove 11 is embedded inside of the optical disk 1, actually formed on a surface of the substrate 2. The substrate 2 and the recording layer 3 are formed in parallel to each other.

Figure 2:
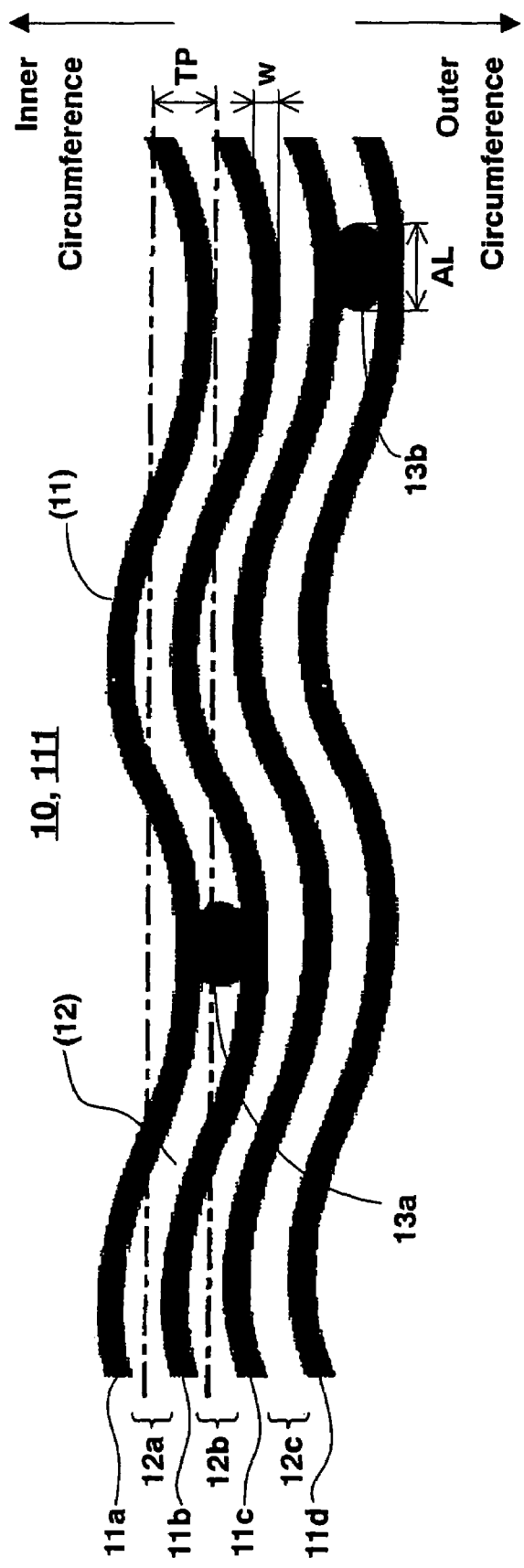
FIG. 2 is a fragmentary plan view of a microscopic construction or a physical format of the optical information recording medium partially enlarged according to the embodiment of the present invention.

FIG. 2 is a fragmentary plan view of a microscopic construction or a physical format of the optical disk 1 shown in FIG. 1, partially enlarged, and shows typically a state of that the optical disk 1 is not recorded, wherein the microscopic construction 10 is a physical format of the optical disk 1. In FIG. 2, the microscopic construction 10 comprises a plurality of grooves 11a through 11d, hereinafter represented by a groove 11, a plurality of lands 12a through 12c, hereinafter represented by a land 12 and a plurality of address pits 13a and 13b, hereinafter represented by an address pit 13. Further, a width of each groove 11 is "w" and each groove 11 is allocated with keeping a space of track pitch TP to an adjoining groove and a length of the address pit 13 is AL. The grooves 11a through 11d are formed on the substrate 2 approximately in parallel to each other. Each groove 11 is deflected by a frequency of integral multiples of a sync-frame frequency of a whole system so as to extract a clock frequency, and formed as a sinusoidal waveform. The waveform can be in synchronism with or asynchronism with adjacent grooves.

The address pit 13 is formed with being scattered in the lands 12a through 12c between the grooves 11a through 11d and loaded with an address information. In other words, the address pit 13 is previously embedded in the substrate 2 so as to bridge adjoining tracks in an "I" shape. The groove 11 sinusoidally deflected and the address pit 13 allocated with scattering between the grooves is formed in a same depth. Since the address pit 13 bridges the adjoining grooves, the address pit 13 can be read out while using either one of adjoining grooves. In other words, it is defined arbitrarily whether an address of a groove is defined by an inner circumference area or an outer circumference area of the groove. The address pit 13 is allocated at a position, wherein the sinusoidal groove 11 is deflected maximally, that is, within ±10 degrees at a peak point of a sinusoidal waveform.

An address information is recorded in accordance with a distance between each address pit 13. Accordingly, the length AL of the address pit 13 itself is kept constant.

Figure 17:
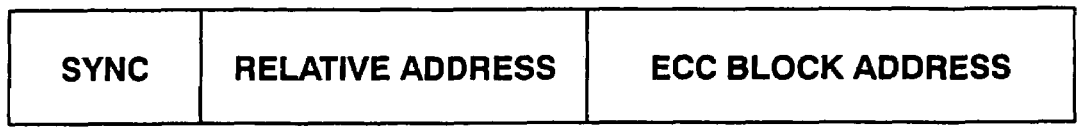
FIG. 17 shows a physical construction format as one example of an address information.

FIG. 17 shows a physical construction format as one example of an address information.

In FIG. 17, a sync-bit or a synchronous signal is allocated at a head of the format and followed by a relative address data and an error correction code (ECC) block address data. The format is composed of, for example, one bit of the sync-bit, 4 bits of the relative address data and 8 bits of the ECC block address data.

Figure 3:
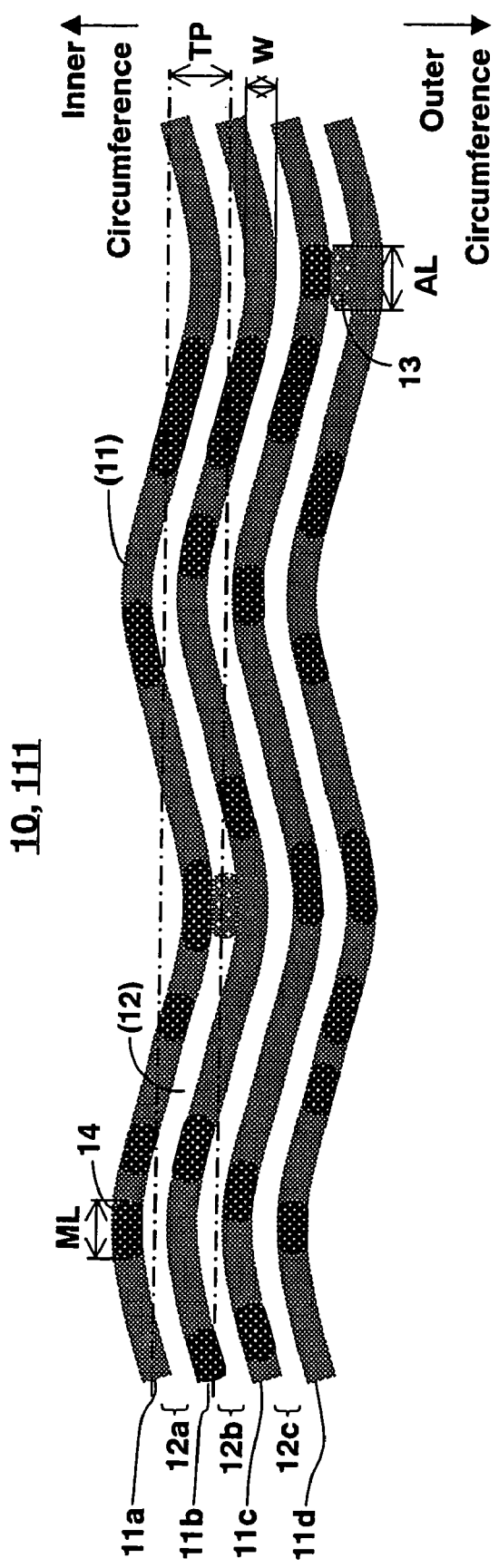
FIG. 3 is another fragmentary plan view of a physical format of the optical information recording medium partially enlarged according to the embodiment of the present invention.

FIG. 3 is another fragmentary plan view of a physical format of the optical disk 1 shown in FIG. 1, partially enlarged, and shows typically a state of that the optical disk 1 is recorded. In FIG. 3, a configuration of the microscopic construction 10 is basically a same as that of FIG. 2. However, a recording mark 14 having a length of ML is recorded in the groove 11 in deflective. The recording mark 14 is a phase change recording, that is, recorded by changing of a material of the recording layer 3 such that a state of not recorded is a nature of crystalline and a state of recording is a nature of amorphous, for example. The recording mark 14 can be reproduced by utilizing a high reflectivity in crystalline and a low reflectivity in amorphous. On the contrary, it can be recorded such that the state of not recorded is in a low reflectivity and the state of recorded is in a high reflectivity by selecting a material.

The recording mark 14 is a modulated signal composed of a digital code commonly known and is a signal having a mark length ML of integral multiples of a channel bit "T". Accordingly, all signals of which a shortest mark length is assigned to 2T, 3T, 4T or 5T can be handled as a same manner as an optical disk commonly available. For example, in a signal system assigning a shortest mark length to 3T, a signal system composed of signals of 3T through 11T such as 8-14 modulation, 8-15 modulation and 8-17 modulation and another signal system composed of signals of 3T through 11T such as 8-16 modulation and a further signal system composed of a 14T signal can be handled.

Figure 19:
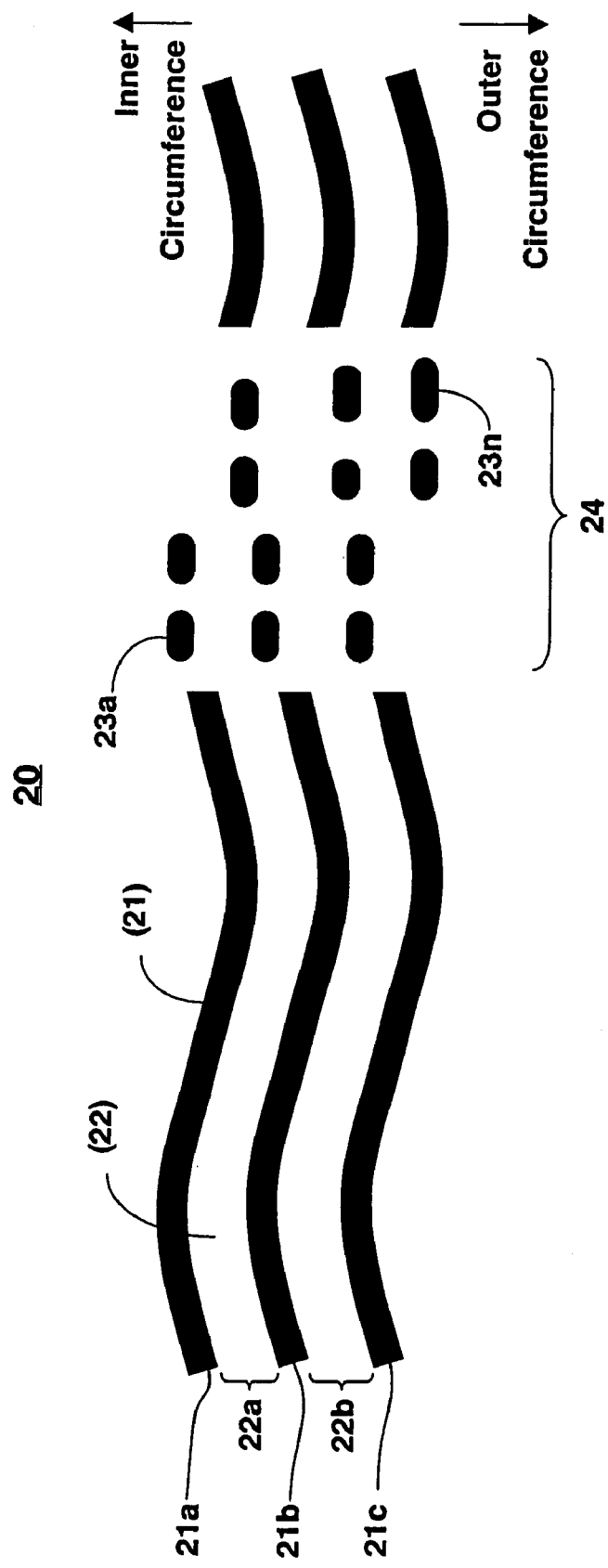
FIG. 19 is a fragmentary plan view of a microscopic construction or a physical format of a land-groove type disk partially enlarged according to the prior art.

In the optical disk 1 of the embodiment of the present invention, as mentioned above, the address pit 13 is recorded with being scattered on the land 12. An inherent area 24 shown in FIG. 19 for the land-groove method is not provided, so that an area utilizing efficiency of the optical disk 1 is superior to that of a disk of the land-groove method. Further, the recording mark 14 is recorded in the groove 11, so that the construction of the optical disk 1 is low in interference with the address pit 13 on the land 12. However, in some cases, the address pit 13 is adjacent to the recording mark 14 as shown in FIG. 3, so that it is necessary to pay attention to readability of the address pit 13 and the recording mark 14 after recorded in adjacent to each other.

With respect to a material of the recording layer 2 utilized for the optical disk 1 of the present invention, a material of phase change such that a reflectivity of the recording layer 2 is more than 15% is suitable, preferably, more than 18% of high reflectivity is more suitable. Particularly, an alloy including antimony, tellurium and a metal having a melting point of less than 1100 degrees centigrade, and having a high contrast of reflectivity between before recording and after recorded is suitable for the material of the recording layer 2. As for a material having a practical recording sensitivity and signal characteristics such as degree of modulation, reflectivity, jitter and a number of rewritable possibilities, a material including antimony and tellurium as essential components and further including at least one of gold, silver, copper, indium, aluminum and germanium is desirable. Particularly, silver-indium-antimony-tellurium (AgInSbTe) alloy, copper-aluminum-tellurium-antimony (CuAlTeSb) alloy, silver-germanium-antimony-tellurium (AgGeSbTe) alloy and gold-germanium-antimony-tellurium (AuGeSbTe) alloy are most desirable materials.

Dimensions are defined for a purpose of explaining recording/reproducing performances, which will be described hereafter. In FIG. 2, a distance between center lines of one groove and its adjoining groove is defined as a track pitch "TP", wherein grooves 11a through 11d are sinusoidally deflected, and a width of the groove 11 itself is defined as "w" and a length of the address pit 13 is defined as "AL". The address pit 13 is driven into approximately a center of the land 12, so that a space between centerlines of the address pit 13 and the groove 11 is approximately 2/TP, not shown. Further, the groove 11 and the address pit 13 are engraved on the substrate 2 in a same depth respectively and the depth is "d", not shown. Furthermore, in FIG. 3, a length of the recording mark 14 after recorded, varies by modulation. However, a shortest mark length is defined as "ML".

By using phase change materials for high density recording mentioned above, trial optical disks having various dimensions (TP, d, w, ML and AL) of microscopic construction are manufactured and their recording/reproducing characteristics are evaluated. According to the evaluations, a most suitable numerical range of address output and dimensional range of the microscopic construction of the optical disk 1 of the embodiment of the present invention can be obtained. In addition thereto, an actual length of "TP" and "ML" are assumed to be approximately 60 to 70% and 35 to 45% of a reproduction spot diameter λ/NA of a laser beam respectively for an optical disk and its drive explained as the embodiment of the present invention.

Results of evaluation on trial optical disks for recording/reproducing characteristics are as follows:

(1) Tracking Performance of a Disk Not Recorded

In a case of a disk after recorded, as shown in FIG. 3, the recording mark 14 having a different reflectivity is formed in the groove 11, so that various methods can be applied to a tracking method of a disk recorded. For example, the DPD (Differential Phase Detection) and the DPP (Differential Push-Pull) tracking methods are available. However, in a case of a disk not recorded, as shown in FIG. 2, no recording mark is formed in the groove 11. Accordingly, only the push-pull method can be applied to a tracking method of a disk not recorded actually.

Figure 4:
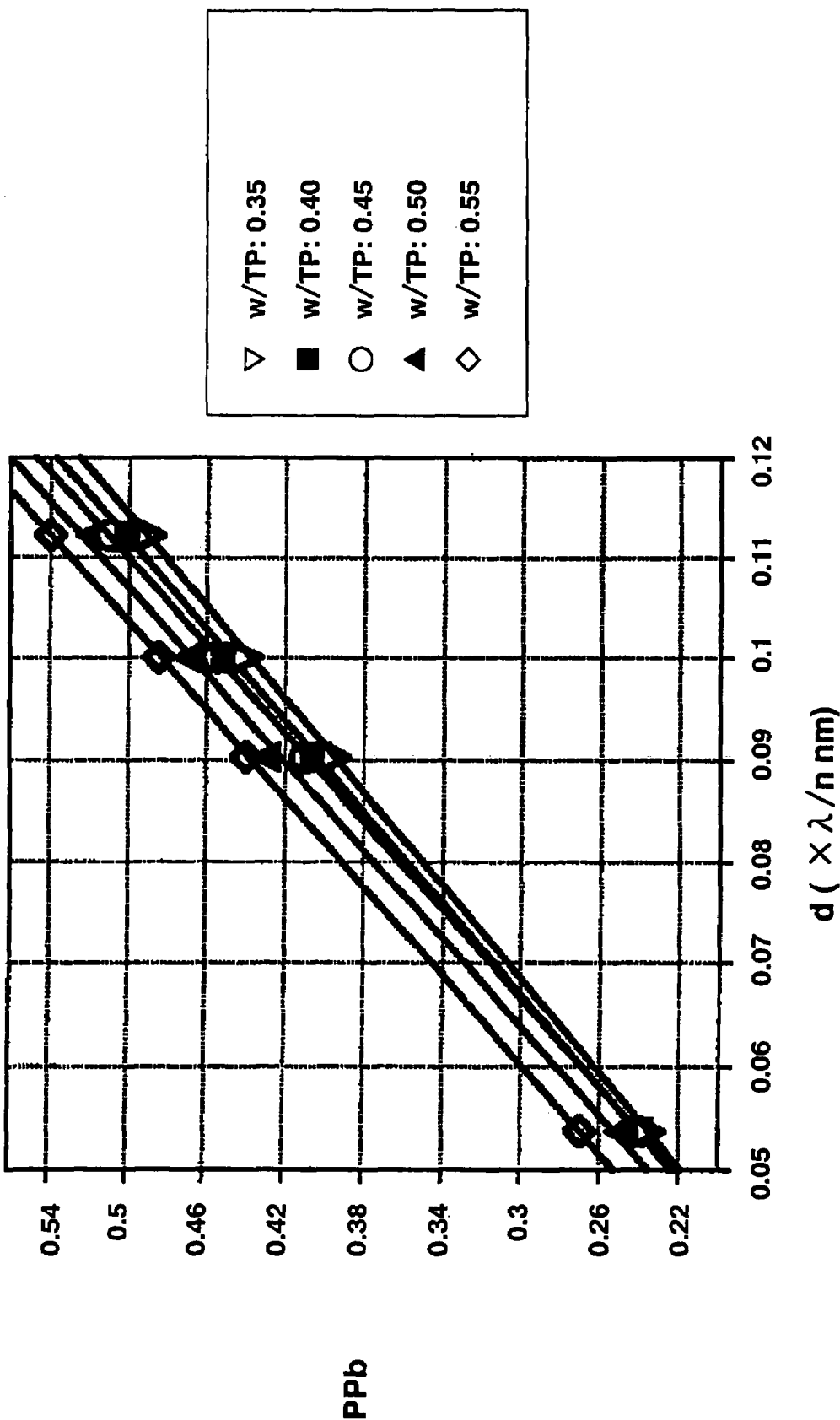
FIG. 4 shows a relation between a depth (d) of a groove and an output (PPb) of a push-pull signal.

A relationship between the depth "d" of the groove 11 and a push-pull signal output PPb is examined and indicated in FIG. 4, wherein the relationship is measured over a range from 0.35 to 0.55 of the ratio of the groove width "w" to the track pitch TP (w/TP). As shown in FIG. 4, the shallower the depth "d" is, the smaller the PPb is. The PPb is maximized at d=0.125λ/n, wherein "n" is a refractive index of a light path. The tracking itself is stable even at a smaller PPb. A limit of being out of tracking is actually examined for a phase change type disk 1 having scattered address pits according to the present invention. The limit is PPb=0.22. The tracking is stable in an area where PPb is more than 0.22. In other words, it is necessary for the depth "d" to satisfy an equation d≧0.05λ/n.

(2) Reproduction Performance of Recording Mark

A jitter is one of indexes representing readout performance of the recording mark 14. While reproducing after recorded, a fluctuation in a time axis direction or a standard deviation divided by a clock frequency is a jitter. The smaller a jitter value is, the more stable a reproduction is. According to the DVD standard, a jitter value is prescribed to not more than 8.0% after passing through an equalizer.

Figure 5:
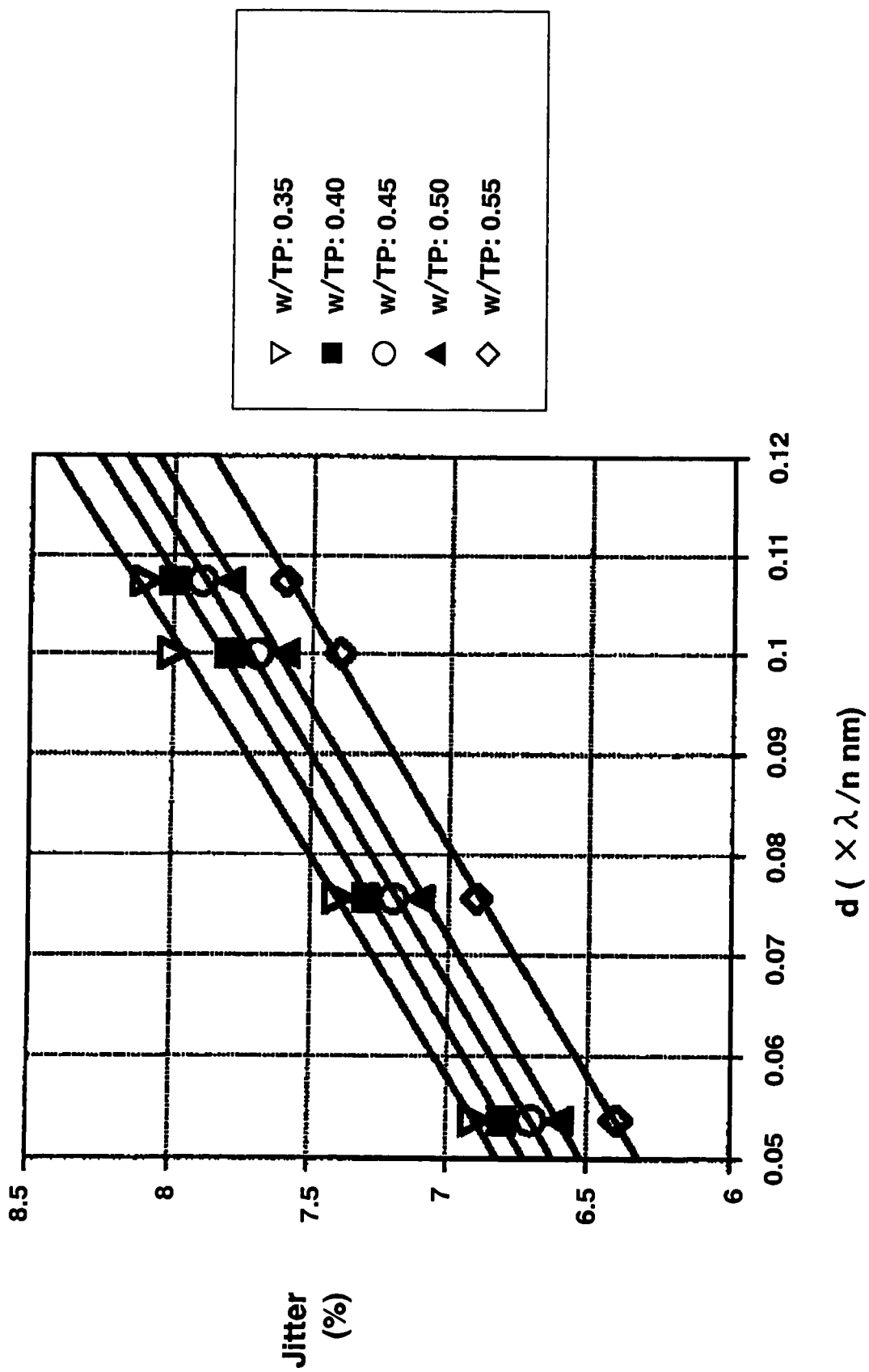
FIG. 5 shows a jitter value measured in response to a depth and a width of the groove.

FIG. 5 shows a jitter value measured in response to a depth and a width of the groove, in a case of 5 tracks and 10 times over written. In FIG. 5, a groove width is represented by w/TP, which is a value of prescribing the width "w" to the track pitch TP. As shown in FIG. 5, the shallower the groove depth "d" is, the better a jitter is obtained. The reason is that the shallower the groove depth "d" is, the higher a reflectivity and a modulation factor of signal can be obtained, and then base noise decreases relatively. An effect of w/TP on a jitter is relatively low.

In order to obtain a jitter of not more than 8.0%, it is necessary for the depth "d" to satisfy an inequality d≦0.1λ/n although it depends upon a groove width. Further, it is also necessary for the w/TP to satisfy an inequality 0.35≦(w/TP)≦0.55. In addition thereto, the address pit 13 is formed as an "I" shape against each groove, so that a width of the address pit 13 is assigned to be a value from 0.65 to 0.45 in proportion to the TP.

(3) Reproduction Performance of Address Pit and Interference with the Address Pit by Recording Mark A pickup installed in a reproducing apparatus such as a DVD player is equipped with a 4 division photo detector. The 4 division photo detector can effectively produce an address signal by arithmetically calculating such as adding, subtracting, multiplying and dividing four output from each segment of the 4 division photo detector.

Figure 6:
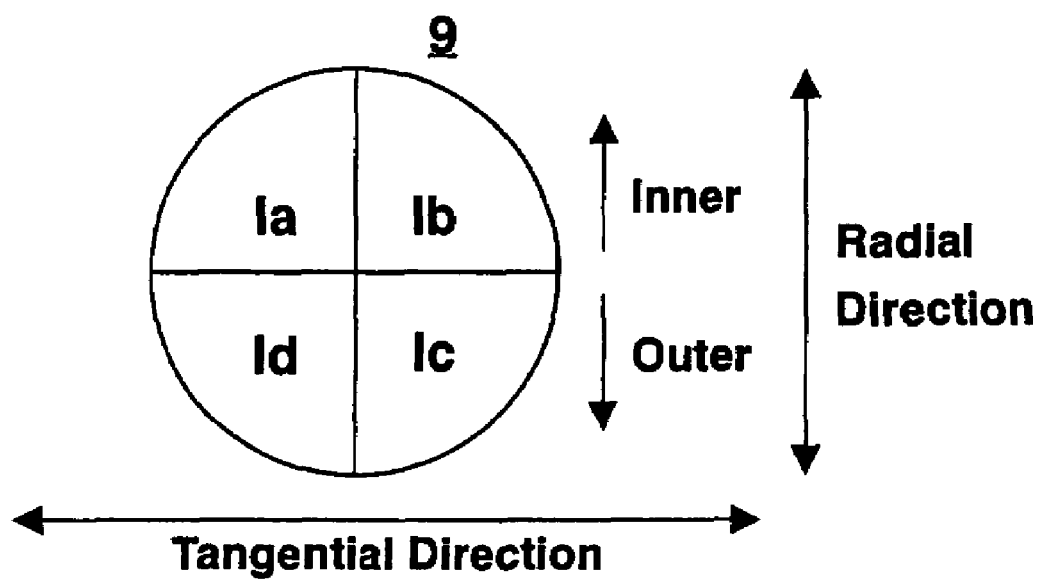
FIG. 6 shows a model of a four-division detector.

FIG. 6 shows a typical 4 division photo detector 9 mentioned above. In FIG. 6, a vertical axis and a horizontal axis are defined as a radial direction and a tangential direction or a track direction respectively with corresponding to FIGS. 2 and 3. Four reproduction output of the 4 division photo detector 9 are assigned as Ia, Ib, Ic and Id respectively. The Ia and Ib are allocated in an innermost circumference area and the Ic and Id are allocated in an outermost circumference area with corresponding to FIGS. 2 and 3. The address pit 13 can be reproduced in high contrast by composing output as an equation (Ia+Ib)−(Ic+Id).

Figure 7:
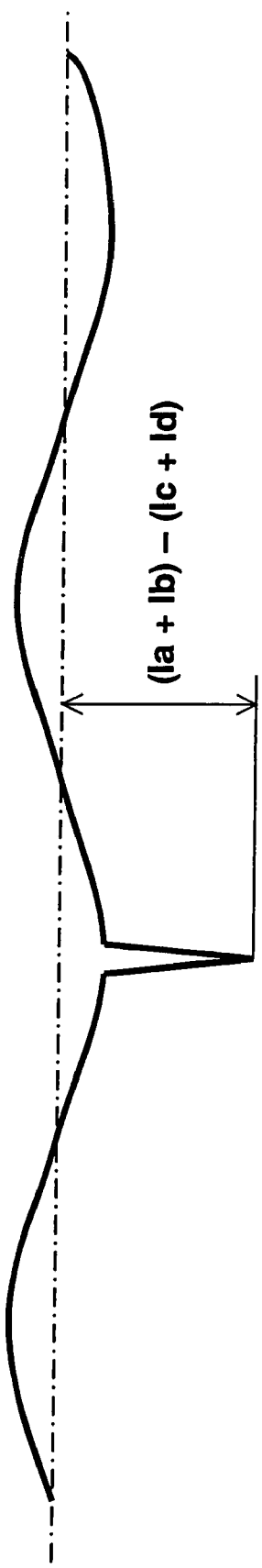
FIG. 7 shows a reproduced waveform in a state of not recorded.

FIG. 7 shows a reproduced waveform in a state of not recorded.

Figure 8:
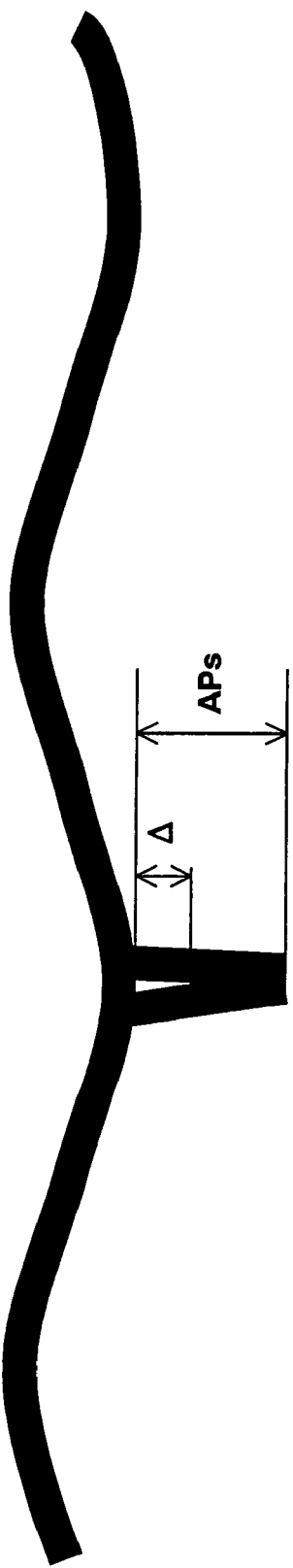
FIG. 8 shows a reproduced waveform in a recorded state.

FIG. 8 shows a reproduced waveform in a recorded state.

In FIG. 7, the waveform is reproduced with superimposing a waveform of the address pit 13 with a waveform of the groove 11 sinusoidally deflected. As shown in FIG. 7, the address pit 13 can be detected as a pulse projected from the total waveform, so that an address can be read out. Accordingly, a standardized value in response to a height of the pulse can be defined as an output of an address pit in a not recorded state. Actually, a number of dividing an absolute value of (Ia+Ib)−(Ic+Id) by a total output of a 4 division photo detector, that is, (Ia+Ib+Ic+Id) is defined as an address pit output (APb) in a not recorded state. The APb means a value of address pit signal component occupying in a reproduced signal in a not recorded state. In other words, $$APb = |(Ia+Ib)-(Ic+Id)|/|(Ia+Ib+Ic+Id)|$$

In a case of measuring more accurately, a filter is desired to be inserted so as to eliminate various noise components. In a case of measuring an absolute value of (Ia+Ib+Ic+Id), for example, a low pass filter having a cut off frequency of 30 kHz shall be inserted. In a case of measuring an absolute value of (Ia+Ib)−(Ic+Id), an amplifier having a frequency range of more than 20 MHz is desired to be used.

An address pit output value is obtained by a diffraction of the address pit 13, so that the address pit output value closely depends upon the depth "d" and the length AL of the address pit 13. An address pit output value APb is hardly read out if the output value is too small. Accordingly, an error rate is apt to increase.

In FIG. 8, a signal of the recording mark 14 recorded in the groove 11 is written over the waveform shown in FIG. 7. Since the signal of the recording mark 14 is superimposed on the groove 11 as if noise, it severely affects reading out the address pit 13, wherein "APs" is an output of an address pit after recorded and "Δ" is an aperture, which is not affected by the recorded mark. In other words, although an address pit can be decoded in a not recorded state, in some cases, it may not be decoded after recorded.

An optical disk produced under various combinations of the "d" and AL is measured up an error rate of an address pit before the optical disk is recorded. After the measurement, the groove 11 of the optical disk is recorded at random, and then an error rate of an address pit is measured once again, wherein an error rate of less than 5% after recorded is a condition of reliability.

Figure 9:
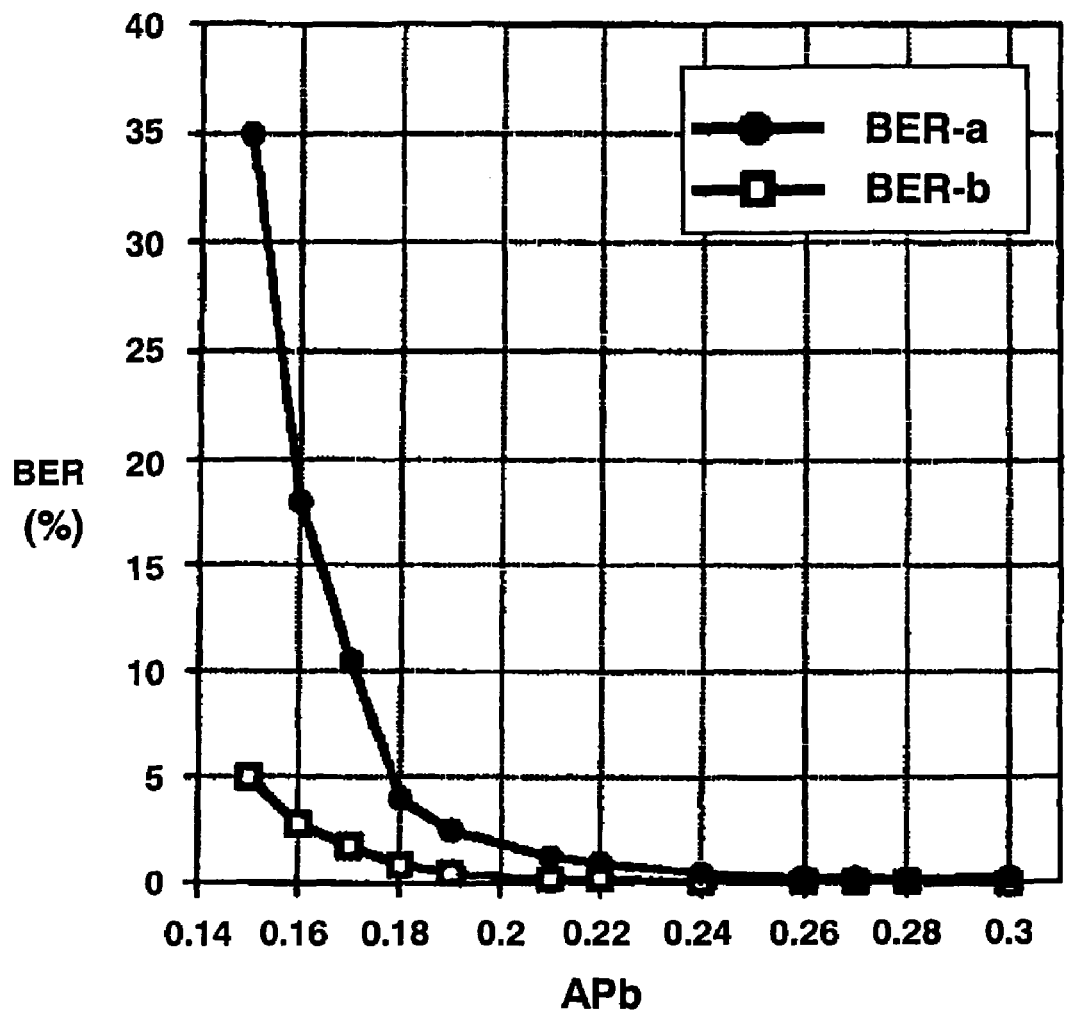
FIG. 9 shows a measured error rate of an address pit.

FIG. 9 shows a measured error rate of an address pit, wherein a horizontal axis is an address pit output value APb and a vertical axis is a block error rate BER measured up more than 1000 ECC blocks. An error rate before recording (BER-b) and an error rate after recorded (BER-a) are plotted together. The larger an address pit output value APb is, the easier an address pit can be read out and the smaller an error rate is. In comparison with before recording and after recorded, an address pit is easily read out before recording. However, an error is apt to happen while reading out after recorded. It is caused by that an address pit signal is easy to be interfered, so that enough APb value is required. According to facts mentioned above, in order to ensure that an error rate is less than 5% after recorded, it is necessary for an address pit output value APb to be more than 0.18. In addition thereto, with minutely analyzing a state in 5% of error rate, it is commonly observed that an RF signal is superimposed and an aperture ratio of an address pit in FIG. 8, that is, Δ/APs shown in FIG. 8 is only 10%. In other words, the Δ/APs is necessary to be more than 10%.

(4) Interference with Recording Marker by Address Pit

The address pit 13 partially contacts with the groove 11, so that it is conceivable that the address pit 13 interferes with reproduction of the recording mark after recorded. Thus, the recording mark 14 of an optical disk having various address pit output values (APb) is read out and a number of errors is measured.

Figure 10:
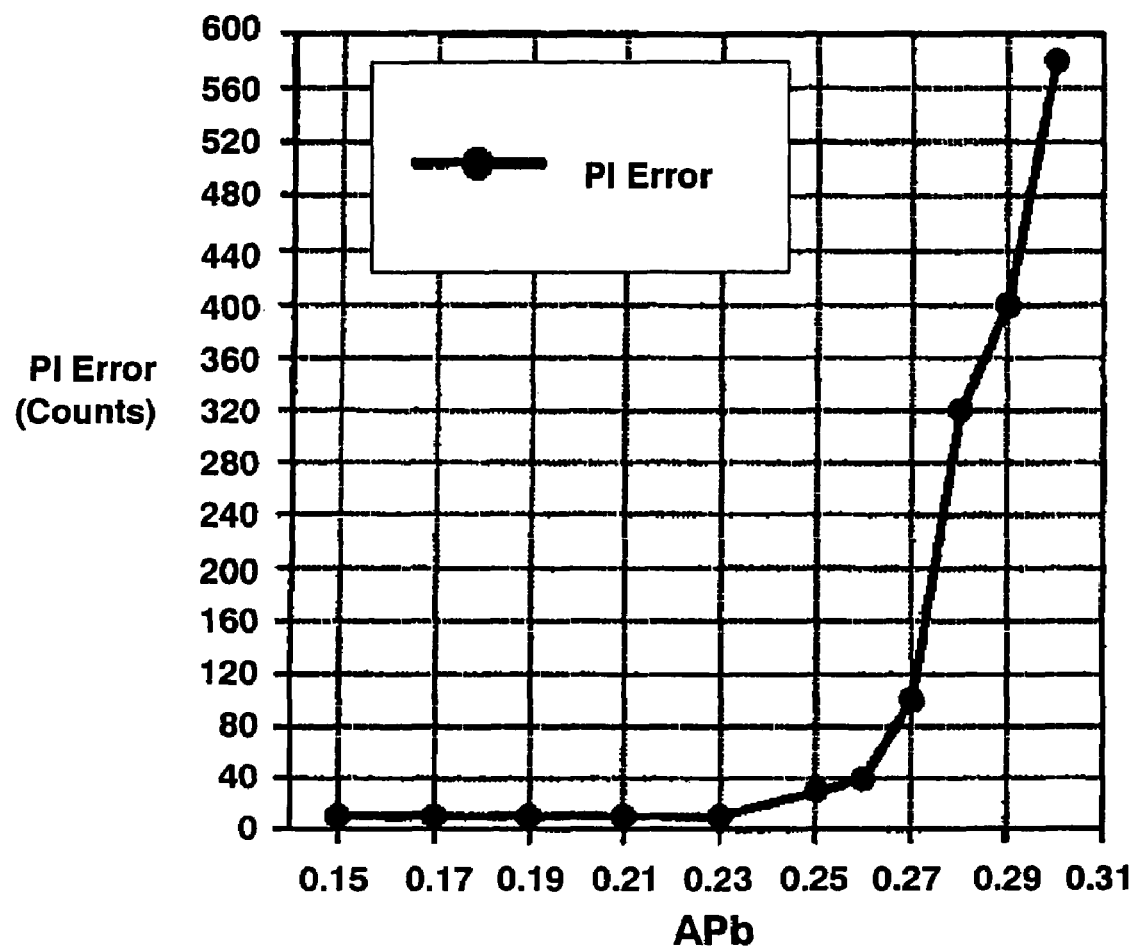
FIG. 10 shows a measured error rate of a recorded mark.

FIG. 10 shows a measured error rate of an recording mark, wherein a horizontal axis is an address pit output value APb and a vertical axis is a number of PI errors, which is a number of block arrays failed in more than one byte for continuing 8 ECC blocks. As shown in FIG. 10, the PI error suddenly increases at a certain APb value. It is conceivable that diffraction light of the address pit 13 interferes with the recording mark 14 and a reading out error occurs. For example, according to the DVD standard, a number of PI error is required to be less than 280, so that an address pit output value APb shall be less than 0.27.

(5) Dimensions of Microscopic Construction for Obtaining Desired Address Pit Output Value APb As mentioned above, a small TP and a shortest mark length ML are assumed for a reproduction spot diameter λ/NA of a laser beam in an optical disk and its drive according to the present invention. Further, as examined in paragraphs (1) and (2) above, a depth "d" of a groove is assumed to be sufficiently shallower than a reproduction wavelength of a laser beam. Conditions of the AL and the "d" are examined to obtain a desired address pit output value APb under above-mentioned conditions.

In consideration of each coherence of AL and ML, the AL and ML are supposed to be relatively in a same order of dimension, so that they are assumed to be k=AL/ML. Relationship between the "k" and an address pit output value APb and relationship between the "d" and an APb are examined. According to the examination, it becomes clear that the larger the "d" becomes and the larger the "k" is, the larger the APb becomes. The APb can be actually expressed by a following equation: $APb=0.14\,k+4.11\,n(d-26)/\lambda$.

As mentioned above, an address pit output APb, which does not affect an actual operation of a drive for recording and reproducing, is obtained and further dimensions such as TP, "d", "w" and "k" of various microscopic constructions are examined. Examinations mentioned in paragraphs (1) through (5) are summarized as follows.

A range of an address pit output APb, which is an address pit signal component occupying in reproduction signals in a state of not recorded, is $0.18<APb<0.27$.

Dimensions of various microscopic constructions are "d", "w" and "k", which satisfy following relationships simultaneously.

$$0.05\lambda/n \leq d \leq 0.1\lambda/n,$$

$$0.35 \leq (w/TP) \leq 0.55 \text{ and}$$

$$0.18 < 0.14\,k+4.11\,n(d-26)/\lambda < 0.27$$

The optical disk 1 having an address pit output in accordance with the present invention can be recorded and reproduced excellently with suppressing interactive interference between the recording mark 14 in a groove and the address pit 13 minimally. Further, the substrate 2 having the dimensions of microscopic construction in accordance with the present invention and the optical disk composed of the microscopic construction can minimize reproduction interference between the recording mark 14 and the address pit 13.

The present invention specifies the dimensions of a microscopic construction of the substrate 2 while manufacturing such the optical disk 1, so that stable manufacturing and supplying of the optical disk 1 can be maintained. An actual manufacturing method of the optical disk 1 in accordance with the present invention is depicted next with referring to FIG. 18.

Figure 18:
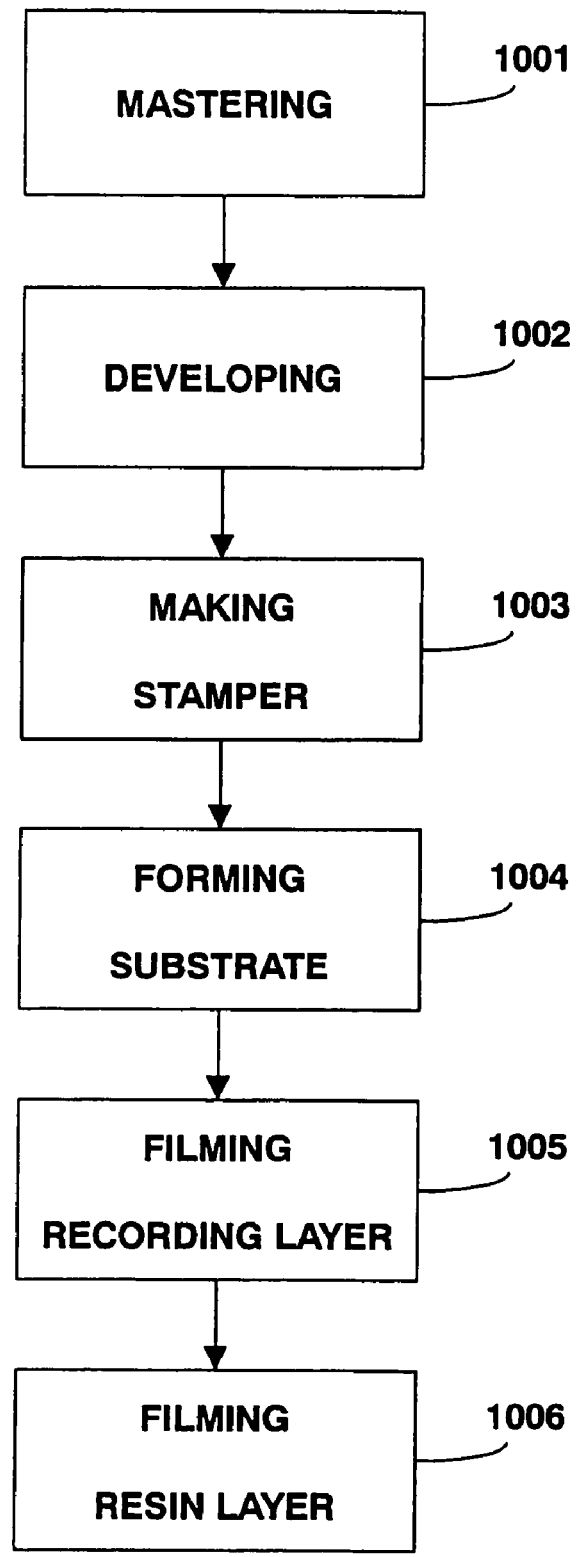
FIG. 18 is a flow chart of a manufacturing method of an optical information recording medium according to the present invention.

FIG. 18 is a flow chart of a manufacturing method of an optical disk according to the present invention.

In FIG. 18, a mastering process is applied to a blank master or a resist disk made of glass, which is commonly known, by a laser beam recorder (LBR) and the microscopic construction according to the present invention is formed on the blank master (Step 1001). With respect to the LBR, a recorder equipped with a laser having a wavelength such as 458, 442, 413, 407, 364, 351, 325, 275, 266, 257 and 244 nm is desired. Further, a 2 beam mastering method by a master beam and a sub beam is effective. The master beam is applied to forming the groove 11 and the sub beam is applied to forming the address pit 13. Furthermore, the master beam is passed through a deflection device such as EOD (Electro-optic Deflector) and AOD (Acousto-optic Deflector) so as for the master beam to be sinusoidally deflected and the sub beam is passed through a modulator such as an EOM (Electro-optic Modulator) and an AOM (Acousto-optic Modulator) so as for the sub beam to be intermittently modulated. In this mastering method by 2 beams, a positioning accuracy is insufficient if a mastering is performed individually by each beam. Therefore, it is desirable that the mastering is performed simultaneously by 2 beams. In this case, it is necessary for a distance between the master beam and the sub beam to be TP/2. In addition thereto, a shape of groove does not appear in this Step 1001 although a latent image is recorded on the blank master.

The blank master recorded with an image is processed by the alkaline development, commonly known, and the mastering image is converted into an uneven surface (Step 1002). A shape of the uneven surface has approximately a same as the microscopic construction 10 of the substrate 2. The blank master processed by the alkaline development is hereinafter called a glass master. The making stamper process such as the conductive process and the electroforming process, commonly known, is applied to the glass master, and then a stamper is made (Step 1003). The stamper has a microscopic construction approximately in reverse to that of the substrate 2.

By using the stamper obtained through processes mentioned above, the substrate 2 is composed by the commonly known forming process (Step 1004). With respect to a material of the substrate 2, such synthetic resins as polycarbonate resin, polysulfone resin, polyphenylene oxide resin, polystyrene resin, polynorbornen resin, poly-methacrylic resin, polymethyl pentene resin, various copolymer and block copolymer having resin skeleton of above-mentioned resins can be utilized. In a case of utilizing the substrate 2 as a light path, optical characteristics such as a refractive index "n" and birefringence of the substrate 2 shall be considered. By assigning the refractive index "n" to 1.45 through 1.65 and the birefringence to less than 100 nm per double paths, for example, interchangeability with a DVD disk can be maintained properly.

Then the recording layer 3 is filmed over the substrate 2. Actually, the recording layer 3 is filmed over the microscopic construction 10 (Step 1005). A phase change material, which is a main component of the recording layer 3, is already mentioned in the previous section. However, in order to adjust an optical characteristic and a heat transfer characteristic, the recording layer 3 can be inserted in between various optical interference films as required. For example, dielectric substances such as SiN, SiC, SiO, ZnS, ZnSSiO, GeN, AlO, MgF, InO and ZrO are effective, particularly, ZnSSiO (mixture of ZnS and $SiO_2$) is excellent in a heat balancing with a phase change material for recording. Further, the recording layer 3 can be composed with laminating an optical reflective film such as aluminum, gold, silver and their alloy together with an optical interference film so as to adjust reflectivity and a heat transfer characteristic. Furthermore, in order to perform a high density recording/reproducing, the super resolution masking film and the contrast enhancing film, commonly known, can be laminated together with an optical interference film. With respect to such a filming method, the vacuum film forming method such as the sputtering method, the ion plating method, the vacuum evaporating method and the CVD (Chemical Vapor Deposition) method, which are commonly known, can be utilized. Particularly, the sputtering method is congenial to a phase change material and excellent in mass-productivity.

A resin layer 4 is formed over the recording layer 3 succeedingly (Step 1006). The resin layer 4 is provided for protecting the recording layer 3 chemically and mechanically. Depending upon a construction of the optical disk 1, adhesion can be given to the resin layer 4. With respect to a material for the resin layer 4, a resin can be selected out of such resins as ultra violet curable resin, various radiation curable resin, electron beam curable resin, thermosetting resin, moisture curable resin and mixture of plural liquid curable resin. The commonly known method such as the spin coat method, the screen printing method and the offset printing method can be utilized for a filming method of the resin layer 4.

The construction of the optical disk 1 shown in FIG. 14 is one of essential constructions. It is apparent that many changes, modifications and variations in the arrangement of equipment and devices and in materials can be made without departing from the invention concept disclosed herein. For example, another substrate is adhered to the optical disk 1 so as to increase strength of the disk. Further, two disks of which construction is the same as that of the optical disk 1 shown in FIG. 14 can be adhered to each other and formed one disk, that is, a double face disk or a two layer disk.

First Embodiment

An application of the optical disk 1 of the present invention to a disk system utilizing a semiconductor laser irradiating a red laser beam is depicted. A wavelength λ of the red laser beam is 650 nm and a numerical aperture NA of an objective lens is 0.6. Accordingly, a reproduction spot diameter λ/NA of the laser beam is 1083 nm or 1.083 μm.

Figure 15:
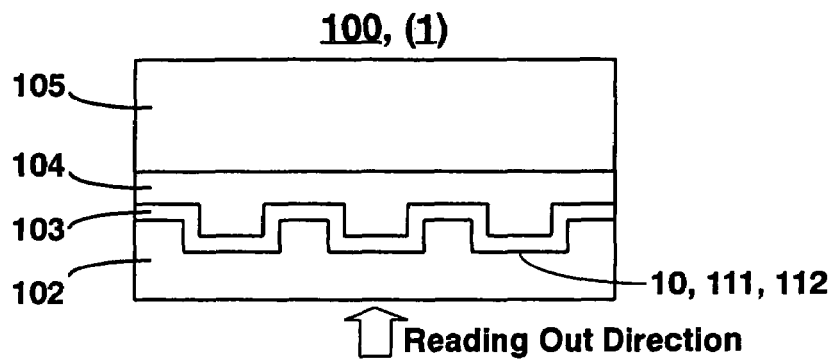
FIG. 15 is a cross sectional view of an optical disk according to the first and a third and a fourth embodiments of the present invention.

FIG. 15 is a cross sectional view of an optical disk according to a first embodiment of the present invention.

In FIG. 15, an optical disk 100 comprises a substrate 102, a recording layer 103, a resin layer 104 and a dummy substrate 105 with being laminated in order. Embossing on a surface of the substrate 102 forms a microscopic construction 10. The substrate 102 is a light path of a laser beam as far as the recording layer 103 and its thickness is 0.6 mm. A material of both the substrate 102 and the dummy substrate 105 is polycarbonate resin and its refractive index "n" at 650 nm is 1.58. The recording layer 103 has a laminated construction mainly composed of a phase change material, which is in a high reflectivity when not recorded and in a low reflectivity when recorded. The recording layer 103 is laminated by ZnS-SiO, AgInSbTe, ZnSSiO, and AlTi in order on the substrate 102 with the sputtering method. Further, its reflectivity is 18 to 30%. In this construction, a recording sensitivity at 650 nm is 7.5 to 14.0 mW. The recording layer 103 can also be recorded by a laser beam of 635 nm and its recording sensitivity can be maintained in a range of 7.0 to 13.0 mW almost a same range as that of 650 nm.

The microscopic construction 10 while not recorded is shown in FIG. 2. A groove 11 is formed spirally and its track pitch TP is 0.74 μm, which is the same as that of a DVD-ROM (DVD-Read Only Memory) disk, and is sinusoidally deflected. A period of the groove 11 is recorded by 8 times a frequency of a sync-frame. Further, amplitude of a waveform is arbitrarily determined within a range of 9 to 17 nm. Furthermore, a respective phase among adjoining tracks is determined at random for the CLV (constant linear velocity) recording. In addition thereto, an address pit 13 having a certain length of AL is engraved on a land allocated outer area than the groove 11 in accordance with an address value.

The microscopic construction 10 when recorded is shown in FIG. 3. A signal to be recorded is the 8-16 modulation signal and its shortest mark length ML is 0.40 μm. The value of 0.40 μm is the same as that of a DVD-ROM disk. Accordingly, a recording capacity of 4.7 GB can be realized by a disk having a high reflectivity when not recorded and in a low reflectivity when recorded. Further, a material of the recording layer 203 is mainly CuAlTeSb having a reflectivity of 15 to 32%. Actually, the recording layer 203 is laminated by AgPdCu, ZnSSiO, CuAlTeSb and ZnSSiO in order on the substrate 202. In this construction, a recording sensitivity at 532 nm is 4.5 to 7 mW.

The microscopic construction 10 while not recorded is shown in FIG. 2. A track pitch TP of the groove 11 is 0.468 μm, which is sinusoidally deflected. A period of the groove 11 is recorded by 6 times a frequency of a sync-frame. Further, amplitude of a waveform is arbitrarily determined within a range of 5 to 9 nm. Furthermore, adjoining tracks are accurately in synchronism with each other for the CAV (constant angular velocity) recording and perfectly in parallel with each other. In addition thereto, an address pit 13 having a certain length of AL is engraved on a land allocated inner area than the groove 11 in accordance with an address value.

The microscopic construction 10 when recorded is shown in FIG. 3. A signal to be recorded is the 8-15 modulation signal and its shortest mark length ML is 0.269 μm. Accordingly, a recording capacity of 11.8 GB can be realized by a disk having a diameter of 120 mm, wherein a radius of recording range of the disk is 24 to 58 mm. In this recording capacity, a TP is equivalent to 66% of a reproduction spot diameter of a laser beam and a shortest mark length ML is equivalent to 38% of the reproduction spot diameter of the laser beam.

An output range of an address pit, which can perform proper recording and reproducing without interference of diameter of 120 mm, wherein a radius of recording range of the disk is 24 to 58 mm. In this recording capacity, a TP is equivalent to 68% of a reproduction spot diameter of a laser beam and a shortest mark length ML is equivalent to 37% of the reproduction spot diameter of the laser beam.

An output range of address pit, which can perform proper recording and reproducing without interference of an recording mark 14 and an address pit 13 in a same groove with each other, that is, a dimension of various microscopic constructions, which satisfies an inequality 0.18<APb<0.27, follows a condition shown below:

0.05×650/1.58≦d≦0.1×650/1.58, that is, 20≦d≦41 nm and 0.35≦(w/0.74)≦0.55. In other word, 0.26≦w≦0.41 μm and 0.18<0.14k+4.11×1.58 (d−26)/650<0.27, that is, 0.18<0.14k+0.01 (d−26)<0.27, wherein ML=0.4 μm. Therefore, 0.18<0.35AL+0.01 (d−26)<0.27. In other words, it can be represented as 44<35AL+d<53.

Figure 11:
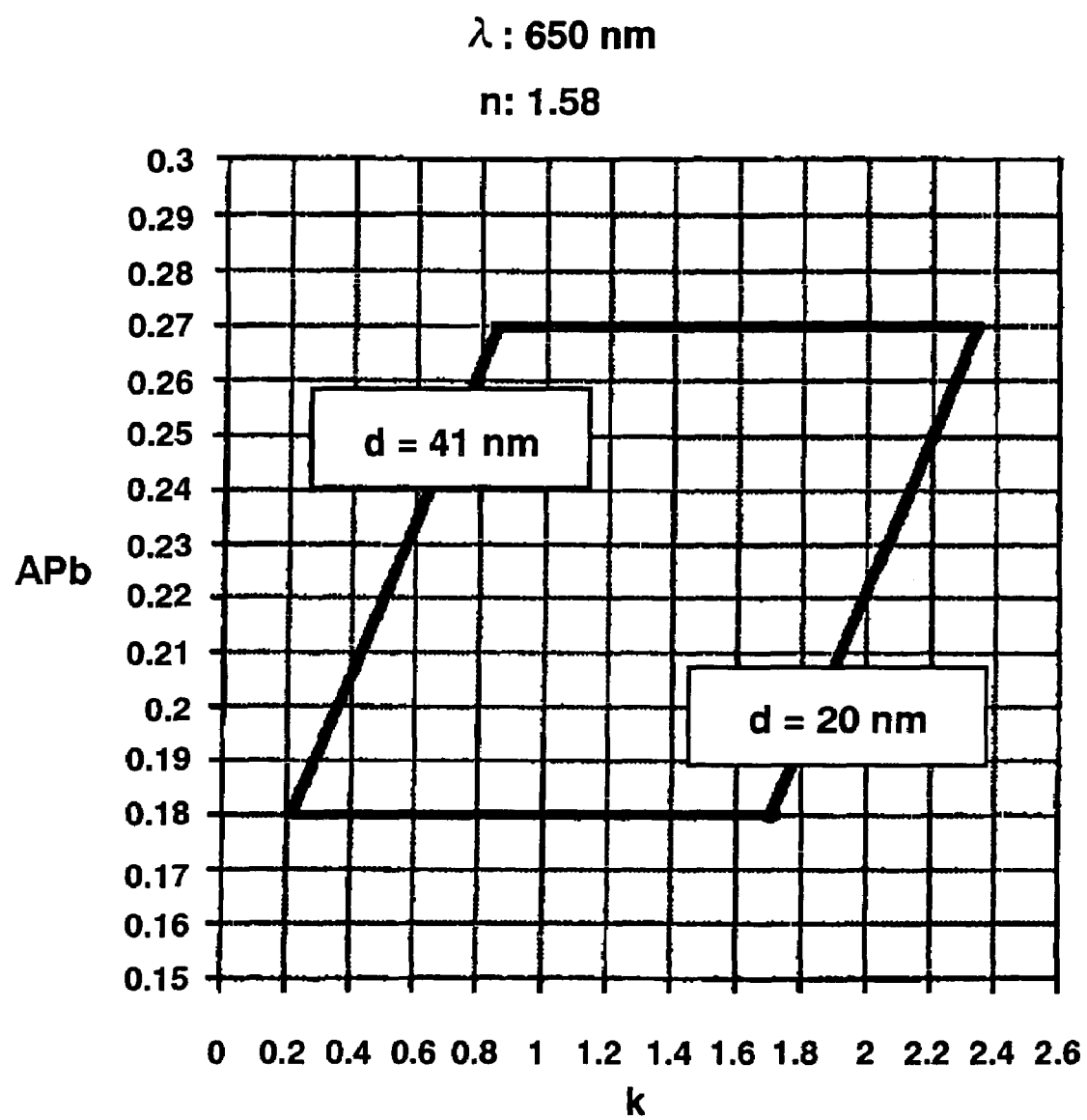
FIG. 11 shows a relationship between an output value (APb) of an address pit and "k", wherein the "k" is obtained by such that an address pit length (AL) divided by a recorded mark length (ML).

Particularly, in order to clarify ranges of the "d" and "k", a relationship between the "k" and APb is exhibited graphically in FIG. 11. The APb is limited by d=20 nm, which is a limit of a tracking performance, and limited by d=41 nm, which is a limit of a jitter. Accordingly, the "d" and "k" take values existing within a range of a parallelogram shown in FIG. 11. In other words, the "d" and "k" are existed within the range enclosed by coordinates (d, k)=(41, 0.22), (41, 0.85), (20, 2.34) and (20, 1.70). In consideration of scattering in manufacturing such as a groove depth "d" and a address pit length AL, the range is desired to be enclosed by coordinates (d, k)=(39.5, 0.34), (39.5, 0.95), (21.5, 2.23) and (21.5, 1.60).

Figure 12:
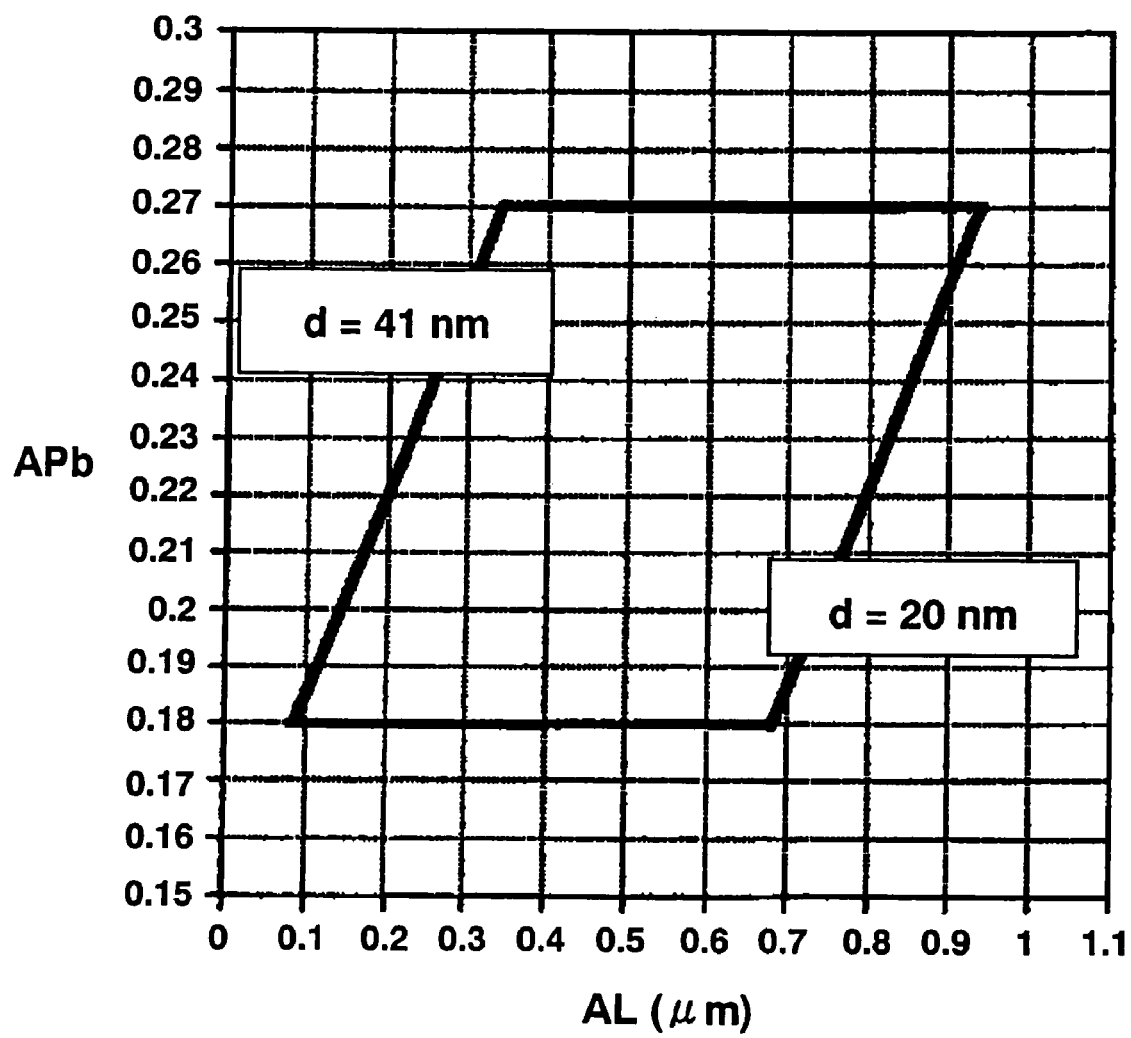
FIG. 12 shows a relationship between an address pit length (AL) and an output value (APb) of an address pit.

ML=0.4 μm, so that the graph shown in FIG. 11 can be rewritten with replacing the "k" with the AL. FIG. 12 shows a graph with exhibiting the horizontal axis with the AL. As shown in FIG. 12, according to the present invention, the "d" and AL are existed within a range enclosed by coordinates (d, AL)=(41, 0.08), (41, 0.34), (20, 0.94) and (20, 0.68). In consideration of scattering in manufacturing, the range is desired to be enclosed by coordinates (d, AL)=(39.5, 0.136), (39.5, 0.380), (21.5, 0.892) and (21.5, 0.640).

Second Embodiment

An application of the optical disk 1 of the present invention to a disk system utilizing a semiconductor laser irradiating a green laser beam is depicted. A wavelength λ of the green laser beam is 532 nm and a numerical aperture NA of an objective lens is 0.75. Accordingly, a reproduction spot diameter λ/NA of the laser beam is 709 nm or 0.709 μm.

Figure 16:
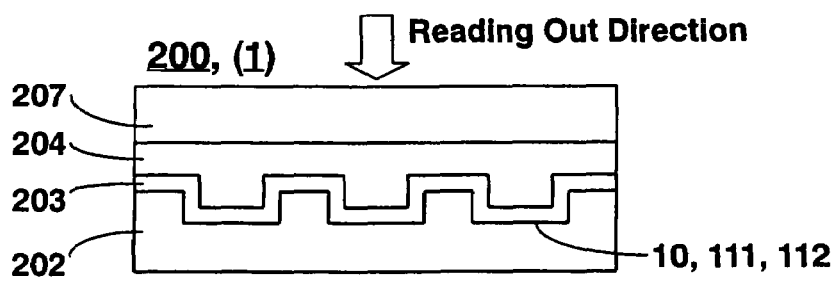
FIG. 16 is a cross sectional view of an optical disk according to a second embodiment of the present invention.

FIG. 16 is a cross sectional view of an optical disk according to a second embodiment of the present invention. In FIG. 16, an optical disk 200 comprises a substrate 202, a recording layer 203, a resin layer 204 and a transmission layer 207 with being laminated in order. Embossing on a surface of the substrate 2 forms a microscopic construction 10. The transmission layer 207 is a light path of a laser beam as far as the recording layer 203 and its thickness is 0.1 to 0.12 mm. The transmission layer 207 is made from acetate resin and its refraction index "n" is 1.6. The recording layer 203 is composed of a phase change material, which is in a an recording mark 14 and an address pit 13 in a same groove with each other, that is, a dimension of various microscopic constructions, which satisfies an inequality 0.18<APb<0.27, follows a condition shown below:

0.05×532/1.60≦d≦0.1×532/1.60, that is, 17≦d≦33 nm and 0.35≦(w/0.468)≦0.55. In other word, 0.16≦w≦0.26 μm and 0.18<0.14k+4.11×1.60 (d−26)/532<0.27, that is, 0.18<0.14k+0.012 (d−26)<0.27.

Figure 13:
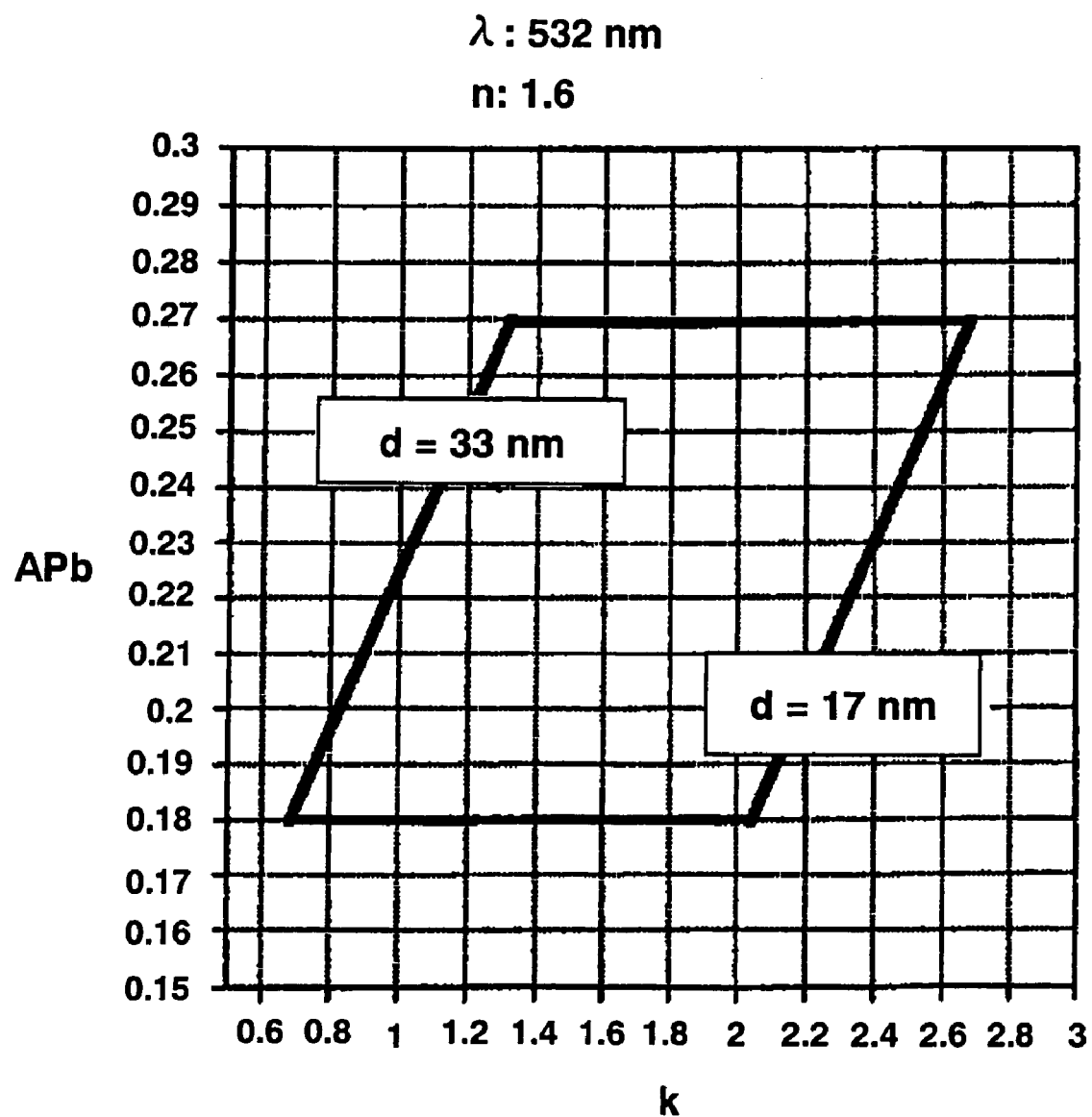
FIG. 13 shows a relationship between an output value (APb) of an address pit and "k", wherein the "k" is obtained by such that an address pit length (AL) divided by a recorded mark length (ML).

Particularly, in order to clarify a range of 0.18<APb<0.27, a relationship between the "k" and APb is exhibited graphically in FIG. 13. The APb is limited by d=17 nm, which is a limit of a tracking performance, and limited by d=33 nm, which is a limit of a jitter. Accordingly, the address pit length AL takes values existing within a range of a parallelogram shown in FIG. 13. In other words, the AL is existed within the range enclosed by coordinates (d, k)=(33, 0.68), (33, 1.32), (17, 2.68) and (17, 2.04).

While the invention has been described above with reference to a specific embodiment relating to a high density optical disk, which is allocated with an address pit in between grooves thereof, it is apparent that many changes, modifications and variations in the arrangement of equipment and devices and in materials can be made without departing from the invention concept disclosed herein. For example, the wavelength of the laser beam utilized for reproducing or recording/reproducing is assigned to 650 nm and 532 nm. However, the wavelength is not limited to them. Any wavelength such as 830, 635, 515, 460, 430, 405 and 370 nm, and their nearby wavelength can be utilized. Such a numerical aperture NA of a lens as 0.4, 0.45, 0.55, 0.65, 0.7, 0.8, 0.85 and 0.9 other than 0.60 and 0.75 can be utilized. Further, a numerical aperture of more than one, which is represented by a solid immersion lens, can also be utilized.

Furthermore, in order to simplify the explanation, the microscopic construction shown in FIG. 2 is illustrated so as to exhibit the outline of the present invention. Any signals other than the groove, land and address pit shown in FIG. 2 can be engraved on the optical disk. For example, a pit array carrying a lead-in signal and another pit array utilized for preventing an optical disk from dump copying and faking can be recorded in an inner circumference area such as an arbitrary radius width within a range with radii 15 to 24 mm for a microscopic construction of the substrate 2. Moreover, a write-once information control area, which is disclosed in the U.S. Pat. No. 5,617,408, called as a BCA (burst cutting area) can be provided in an inner circumference area of an optical disk. In addition thereto, a thickness, an inner construction, outer dimensions and component materials of each layer can also be changed or modified.

Third Embodiment

Two embodiments related to the optical disk 1, according to the present invention, comprising a substrate formed with address pits, which are allocated in sinusoidally deflected grooves and in between the grooves, a recording layer, which contains at least rewritable phase change material having a reflectivity of more than 15%, and a resin layer formed over the recording layer are explained and further a method extending the present invention over the embodiments is described above. An optical disk 300, which is provided with a particular pit array of preventing the optical disk from a dump copying, that is, duplicating whole software totally in an independent area and further an address pit is embedded in the pit array, is explained next as an application.

Figure 20:
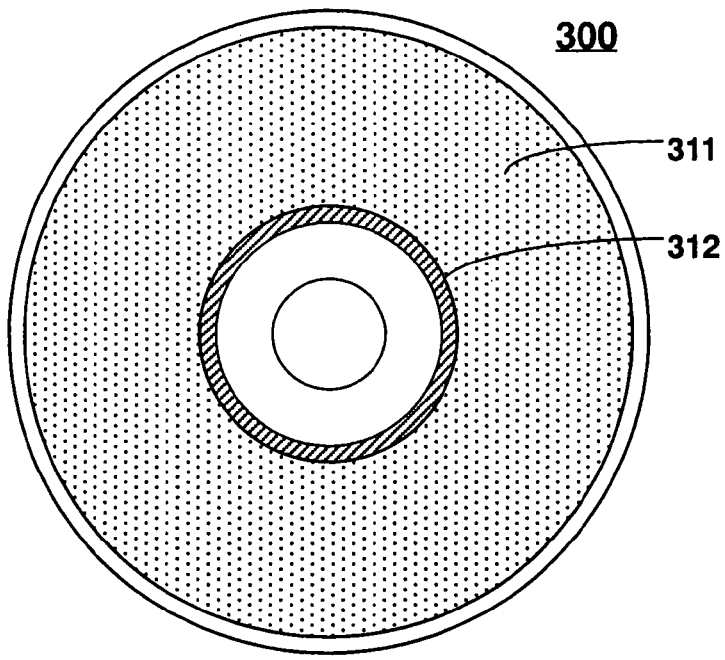
FIG. 20 is a plan view of an optical information recording medium according to an embodiment of the present invention.

FIG. 20 is a plan view of an optical disk according to an embodiment of the present invention. In FIG. 20, an optical disk 300 comprises a first area 311 having a first microscopic construction 111 and a second area 312 having a second microscopic construction 112. The first microscopic construction 111 is an area of being formed with grooves sinusoidally deflected and address pits, which are allocated with being scattered in sinusoidally deflected grooves and in between the sinusoidally deflected grooves, and has a same microscopic construction as the microscopic construction 10 of the optical disk 1 according to the present invention. In other words, a microscopic construction while not recorded is a same construction as that of shown in FIG. 2. Further, the groove 11 can be recorded and a microscopic construction when recorded is a same construction as that of shown in FIG. 3.

Figure 21:
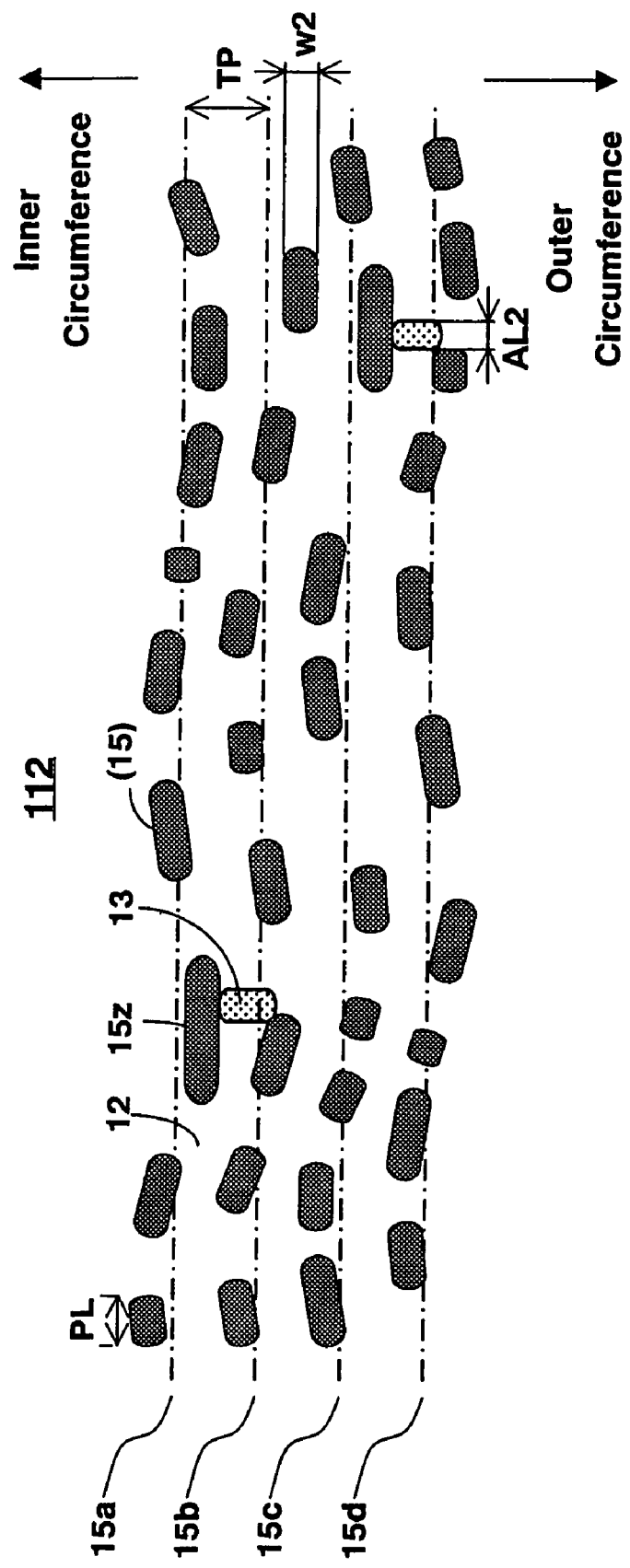
FIG. 21 is a fragmentary plan view of a microscopic construction or a physical format of the optical information recording medium partially enlarged according to the embodiment of the present invention.

The second microscopic construction 112 is at least composed of address pits, which are allocated with being scattered in a pit array and land area. FIG. 21 is a fragmentary plan view of the second microscopic construction 112 of the optical disk 300, partially enlarged, while the optical disk 300 is not recorded. In FIG. 21, a plurality of pit arrays 15a through 15d, hereinafter represented a pit array 15 having a shortest pit length PL and a pit width "w2", which are modulation signals utilized for a copy guard, are engraved on the substrate 2 approximately in parallel with each other and form tracks having a track pitch TP respectively. Each pit array 15 is deflected by a frequency of integral multiples of a sync-frame frequency of a whole system so as to extract a clock frequency and formed as a sinusoidal waveform. The waveform can be in synchronism with or asynchronism with adjacent pit arrays. An address pit 13 is engraved with being scattered in between tracks, that is, in the land area 12 and carries an address information. In other words, the address pit 13 is formed in the land area 12, so that the address pit 13 can be read out by a reproducing apparatus and a recording/reproducing apparatus equipped with the 4 division detector 9 as same manner as that for the aforementioned optical disk 1. The address information is recorded in accordance with a distance between each address pit 13. Therefore, a length AL2 of the address pit 13 is assumed to be constant. FIG. 17 is an information format exhibiting one example of an address information. A sync-bit or a synchronous signal is allocated at a head of the information format and followed by a relative address data and an ECC (error correction code) block address data. The format is composed of, for example, one bit of the sync-bit, 4 bits of the relative address data and 8 bits of the ECC block address data. It is arbitrarily defined whether an inner circumference side or an outer circumference side of the pit array 15 is assigned to be an address of the pit array 15. Further, the address pit 15 is allocated at a position, where the sinusoidal groove 11 is maximally deflected, that is, within 10 degrees from a peak of the sinusoidal waveform. Both the pit array 15 and the address pit 13 are a same depth d2 (not shown).

The optical disk 300 of the present invention comprises two individual microscopic constructions, that is, the first microscopic construction 111 and the second microscopic construction 112 and they can be arbitrarily allocated. In other words, they can be allocated in either an inner circumference area or an outer circumference area. Further, it can be feasible that the second microscopic construction 112 is contained in the first microscopic construction 111. A perpendicular sectional construction of the optical disk 300 at least comprises a substrate 2, a recording layer 3 and a resin layer 4 as same as that of the optical disk 1. Any construction shown in FIGS. 14 through 16, for example, can be applicable for the optical disc 300. Furthermore, the recording layer 3 contains at least a phase change recording material and its reflectivity is more than 15%. It is acceptable that the first microscopic construction 111 and the second microscopic construction 112 are different from each other in physical parameters such as different track pitches TP and TP2, different depths "d" and "d2" and different widths "w" and "w2". However, it is desired that some parameters are a same so as to simplify a system and to manufacture the optical disk 300 easier. It is more desired that all the parameters are the same. With respect to an address information to be engraved, it is desired that the first and the second microscopic constructions 111 and 112 share one consistent table and utilize the table not so as to be overlapped each other.

The first area 311 or the first microscopic construction 111 of the optical disk 300 is an area for recording and reproducing as same as that of the aforementioned optical disk 1, so that an address information is necessary to be read in either states of not recorded or recorded. Further, an interference of the address information with a recording signal shall be considered. Accordingly, a signal output, which complies with the aforementioned conditions (1) through (4), and dimensions of a microscopic construction are necessary for reading out an address information.

On the other hand, the second area 312 or the second microscopic construction 112 of the optical disk 300 is another area for preventing the optical disk 300 from dump copying and each dimension of the second microscopic construction 112 is prescribed so as for a system to brake down when a malicious person tries to record in the second area 112. In a case that dimensions of the second area 312 are almost a same as those of the first area 311, for example, signals from both areas are mixed and either signals can not be read out by writing in for a dump copying. With prescribing TP2=TP, it is a most ideal case that PL=ML.

With assuming such an illegal copying, it is not necessary for readability of the address pit 13 after recorded or dump copied to be considered. However, it is necessary for an address information to be accurately read out while not recorded. As seen from FIG. 21, one pit of the pit array 15 and the address pit 13 are a similar signal, so that it is necessary for a signal output of the address pit 13 to exceed that of the pit array 15.

Figure 22:
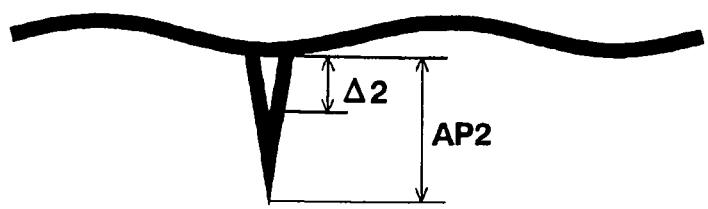
FIG. 22 shows a reproduced waveform at a microscopic construction in a state of not recorded.

While the optical disk 300 is not recorded, the readability of the address pit 13 of the second area 312 (the second microscopic construction 112) is observed by using the 4 division detector 9 shown in FIG. 6 and by reproducing the composite output (Ia+Ib)−(Ic+Id) from the 4 division detector 9. FIG. 22 shows a reproduced waveform, which is obtained such that the composite output (Ia+Ib)−(Ic+Id) is passed through an amplifier having a bandwidth of 20 MHz or more. As shown in FIG. 21, the address pit 13 is superimposed on a sinusoidally deflected track and a waveform composed of the pit array 15 and the address pit 13 is reproduced. An address can be read out from the composed waveform if the address pit 13 can be detected out from the composed waveform. A readout performance of an address depends upon an output of the address pit 13: the larger the output and the smaller a leakage from the pit array 15, the better the performance can be obtained. Accordingly, the larger an aperture ratio of the address pit shown in FIG. 22 is, the lower in error rate the signal is. An aperture ratio in the second area 112 is prescribed to "R" and defined as R=Δ2/AP2. In order to obtain correlation between the aperture ratio "R" and an error rate of the address pit 13, several types of the optical disk 300 are produced with varying the parameter AL2 as a trial. Further, pit arrays are modulated by the 8-16 modulation method and a pit 15Z adjoining to the address pit 13 shown in FIG. 21 is arranged to be 14T, wherein "14T" is the sync-signal. An error rate of the address pit 13 in a trial disk, which is manufactured as mentioned above, is measured while the trial disk is not recorded.

Figure 23:
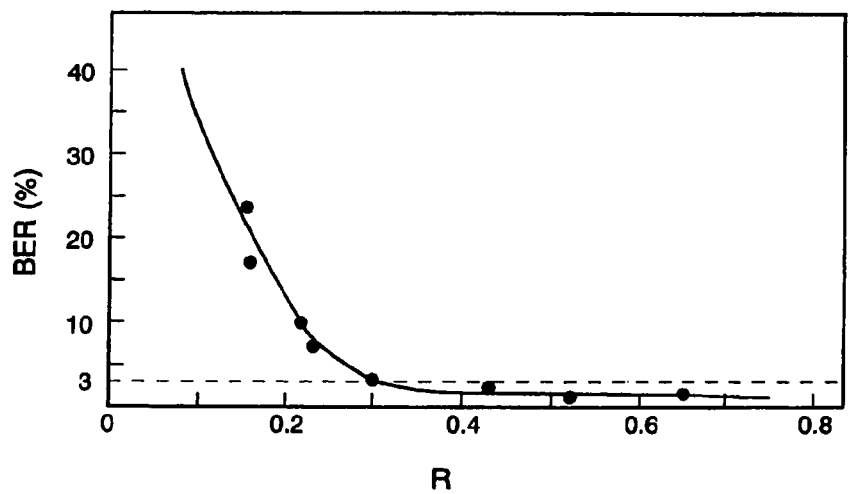
FIG. 23 shows a measured error rate of an address pit.

FIG. 23 shows a measured error rate of an address pit in the second area 112 of the optical disk 300. The horizontal axis is the aperture ratio "R" of an address pit and the vertical axis is a block error rate (BER) measured up more than 100 ECC blocks. Further, it is one condition of reliability that an error rate shall be 3% or less while the disk is not recorded. As shown in FIG. 23, the larger value the aperture ratio "R" of the address pit is, the easier the address pit can be read out and the smaller the error rate is. In order to maintain an error rate of 3% or less, it is found that the aperture ratio "R" of an address pit shall be 0.3 or more, that is, 30% or more.

An address pit performance, which ensures actual operation of a drive for recording and reproducing the optical disk 300 and which is studied as mentioned above, is summarized as follows. In other words, a performance index of an address pit signal in a not recorded state shall satisfy following conditions.

The first area 311 (first microscopic construction 111): 18<APb<0.27

The second area 312 (second microscopic construction 112): R>0.3

Microscopic dimensions, which satisfy a performance of the address pit signal mentioned above, particularly, microscopic dimensions of the second area 312 are hard to specify due to too many parameters. However, a limiting range of the second area 312 is rather wider in comparison with that of the first area 311, which requires that respective address error rate shall be maintained on both recording and reproducing. Further, since parameters of the first and second areas 311 and 312 are desired to be common as far as possible, an limiting range of the first area 311 shall be examined whether or not it is applied to the second area 312 as it is with respect to each case. It is better to modify partially, if necessary. However, in most cases, it is possible to apply the limiting range of the first area 311 to the second area 312 as it is.

Fourth Embodiment

An application of the optical disk 100 of the present invention to a disk system utilizing a semiconductor laser irradiating a red laser beam is depicted. A wavelength λ of the green laser beam is 650 nm and a numerical aperture NA of an objective lens is 0.6. Accordingly, a reproduction spot diameter λ/NA of the laser beam is 1083 nm or 1.083 μm.

Figure 26:
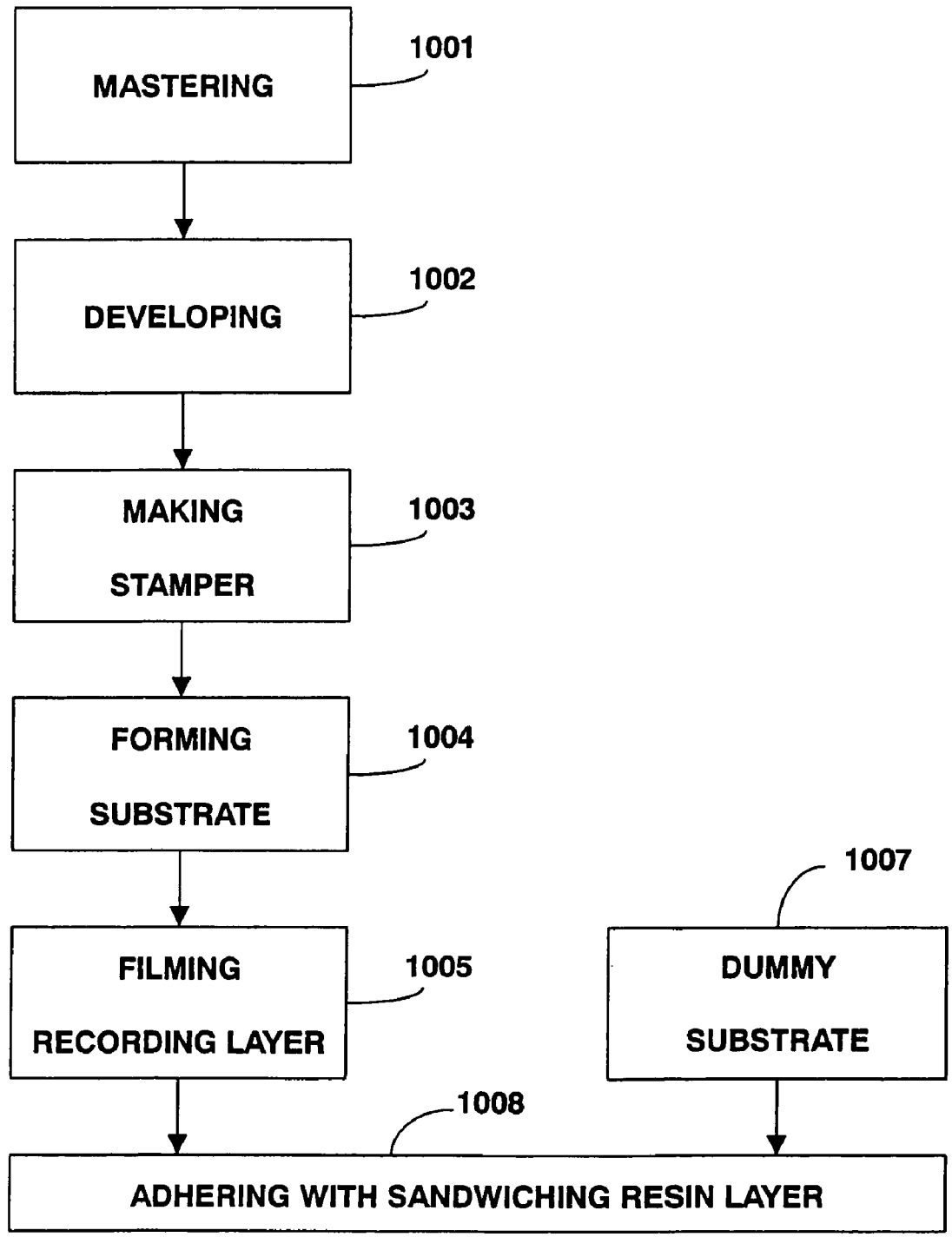
FIG. 26 is a flow chart of the manufacturing method of the optical disk according to the first through fourth embodiments.

A cross sectional view of an optical disk 100 is shown in FIG. 15. The optical disk 100 is a single side disk and can be recorded on and reproduced from either side of the disk. A first and second microscopic constructions 111 and 112 are engraved on a surface of the substrate 102. The substrate 102 is a light path of a laser beam as far as the recording layer 103 and its thickness is 0.6 mm. A material of the substrate 102 is polycarbonate resin and its refractive index "n" at 650 nm is 1.58. The recording layer 103 has a laminated construction mainly composed of a phase change material, which is in a high reflectivity when not recorded and in a low reflectivity when recorded. The recording layer 103 is laminated by ZnS-SiO, AgInSbTe, ZnSSiO, and AlCr in order on the substrate 102 with the sputtering method. An optical disk 100 is manufactured in accordance with a manufacturing method shown in FIG. 26. The manufacturing method is similar to that of shown in FIG. 18, so that manufacturing steps common to those of FIG. 18 are omitted. A dummy substrate 105 having a thickness of 0.6 mm is prepared (Step 1007) after filming a recording layer 103 on a substrate 102 (Step 1005). The dummy substrate 105 is adhered to a lamination of the recording layer 103 and the substrate 102 with sandwiching a resin layer 104 between the recording layer 103 and the dummy substrate 105 (Step 1008), and then the optical disk 100 is manufactured. In this construction, a recording sensitivity of the recording layer 103 at 650 nm is 7.5 to 14.0 mW. The recording layer 103 can also be recorded by a laser beam of 635 nm and its recording sensitivity can be maintained in a range of 7.0 to 13.0 mW almost a same range as that of 650 nm.

Figure 25:
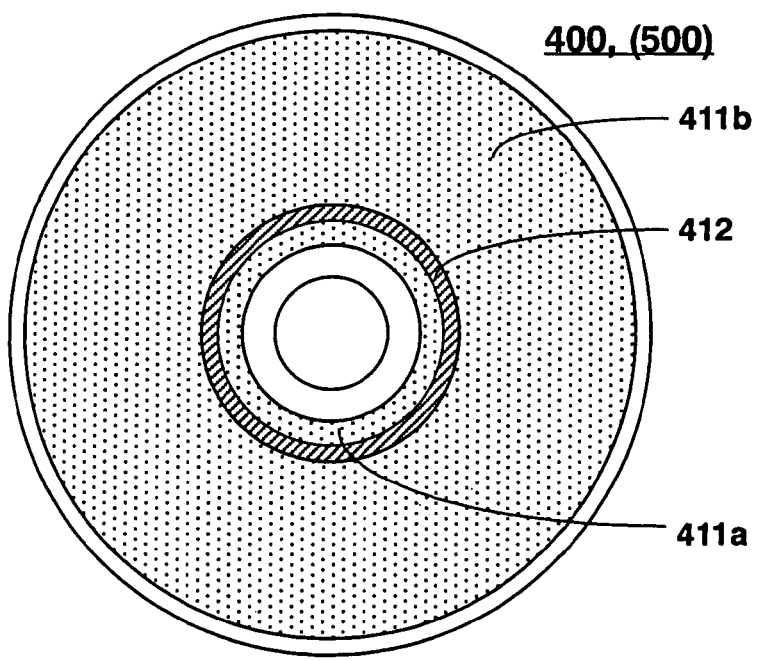
FIG. 25 is a plan view of an optical information recording medium according to the fourth and fifth embodiments of the present invention.

FIG. 25 is a plan view of an optical disk 400 according to the fourth embodiment of the present invention. As shown in FIG. 25, the optical disk 400 comprises a first area 411a having the first microscopic construction 111, a second area 412 having the second microscopic construction 112 and another first area 411b having the first microscopic construction 111. In other words, the optical disk 400 comprises the first areas 411a and 411b having the first microscopic construction 111 for recording and reproducing and the second area 412 having the second microscopic construction 112 for preventing the optical disk 400 from dump copying. The first areas 411a and 411b are an area, which is engraved with the groove 11 for recording and reproducing and the address pit 13 as shown in FIG. 2. The second area 412 is another area engraved with the specific pit array 15 for preventing the optical disk 400 from dump copying and the address pit 13 as shown in FIG. 21. Actually, the optical disk 400 comprises the first area 411a, the second area 412 and the first area 411b in order from the innermost circumference area to the outermost circumference area.

The groove 11 having a width of "w" is provided spirally in the first areas 411a and 411b and its track pitch TP is 0.74 μm as same as that of a DVD-ROM disk and sinusoidally deflected. A period of the groove 11 is recorded by eight times a sync-frame frequency. Further, amplitude of a waveform of the groove 11 is arbitrarily prescribed within a range of 9 to 17 nm. Furthermore, a respective phase among adjoining tracks is determined at random for the CLV (constant linear velocity) recording. Moreover, an address pit 13 having a certain length of AL is engraved on a land allocated outer area than the groove 11 in accordance with an address value. In addition thereto, a depth of the groove 11 is a same as that of the address pit 13 and the depth is "d" respectively.

The specific pit array 15 having a width of "w2" is also provided spirally in the second area 412 and its track pitch TP2 is 0.74 μm as same as that of the first area 411 and sinusoidally deflected. A period of the groove is recorded by eight times a sync-frame frequency. Further, amplitude of a waveform of the groove is arbitrarily prescribed within a range of 9 to 17 nm. Furthermore, a respective phase among adjoining tracks is determined at random for the CLV (constant linear velocity) recording. Moreover, an address pit 13 having a certain pit length of AL2 is engraved on a land allocated outer area than the specific pit array 15 in accordance with an address value. A depth of the specific pit array 15 is a same as that of the address pit 13 and the depth is "d2". In addition thereto, the specific pit array 15 is modulated by the 8-16 modulation method and its shortest pit length PL, that is, the 3T signal is 0.40 μm. Each address pit 13 is provided with the pit 15z composed of the 14T signal with being adjacent to the address pit 13.

The microscopic construction 111 in the first areas 411a and 411b is show in FIG. 3 while the optical disk 400 is recorded. A signal is recorded within the groove 11 and its recording mark 14 is a signal of the 8-16 modulation method. Further, a shortest mark length ML is 0.40 μm. In this case, the TP or the TP2 is equivalent to 68% of a reproduction spot diameter of a laser beam and a shortest mark length ML, that is, the PL is equivalent to 37% of the reproduction spot diameter of the laser beam.

In the first area 411, an output range of address pit, which can suppress an interference between an recording mark 14 in the groove 11 and an address pit 13 minimally, that is, a dimension of various microscopic constructions, which satisfies an inequality 0.18<APb<0.27, follows a condition shown below as same as that of the first embodiment: 20≦d≦41 nm and 0.35≦(w/0.74)≦0.55, and further, 44<35AL+d<53.

A range of the "d" and AL to realize the above inequality is existed within a parallelogram shown in FIG. 12. In other words, the "d" and AL are existed within the range enclosed by coordinates (d, AL)=(41, 0.08), (41, 0.34), (20, 0.94) and (20, 0.68).

With respect to the second area 412, it is examined whether or not these microscopic dimensions can be applied, next. Trial optical disks are manufactured with varying each w2/TP2, that is, w2/0.74 of 4 coordinates of the parallelogram from 0.35 to 0.55, and then the disks are measured with an aperture ratio "R" of the second area while not recorded and its error rate, which is a block error rate measured with more than 100 ECC blocks. A result of the measurement is shown in Table 1. As shown in Table 1, it is apparent the "R" takes values from 0.45 to 0.75 at d2=20 nm and takes values from 0.48 to 0.78 at d2=41 nm. These values are all in R>0.3 and a measured error rate is less than 2.3%. Accordingly, sufficiently low error rate can be obtained. In other words, the microscopic dimensions such as "d2", "w2" and AL2 in the second area 412 can be defined as a same range as those of the first area 411. Therefore, there is no difficulty in a system design for reproducing two areas.

TABLE 1

| d2 (nm) | AL2 (μm) | w2/TP2 | R | BER (%) |
|---|---|---|---|---|
| 20 | 0.680 | 0.35 | 0.45 | 2.3 |
| 20 | 0.680 | 0.45 | 0.45 | 2.0 |
| 20 | 0.680 | 0.55 | 0.54 | 1.5 |
| 20 | 0.940 | 0.35 | 0.66 | 1.0 |
| 20 | 0.940 | 0.45 | 0.70 | 0.8 |
| 20 | 0.940 | 0.55 | 0.75 | 0.5 |
| 41 | 0.134 | 0.35 | 0.48 | 2.3 |

TABLE 1-continued

| d2 (nm) | AL2 (μm) | w2/TP2 | R | BER (%) |
|---|---|---|---|---|
| 41 | 0.134 | 0.45 | 0.55 | 1.2 |
| 41 | 0.134 | 0.55 | 0.60 | 0.9 |
| 41 | 0.340 | 0.35 | 0.68 | 0.8 |
| 41 | 0.340 | 0.45 | 0.73 | 0.5 |
| 41 | 0.340 | 0.55 | 0.78 | 0.4 |

TP1 = TP2 = 0.74 (μm), ML = PL = 0.40 (μm)

Fifth Embodiment

An application of the optical disk 100 of the present invention to a disk system utilizing a semiconductor laser irradiating a red laser beam is depicted. A wavelength λ of the green laser beam is 650 nm and a numerical aperture NA of an objective lens is 0.6. Accordingly, a reproduction spot diameter λ/NA of the laser beam is 1083 nm or 1.083 μm.

Figure 24:
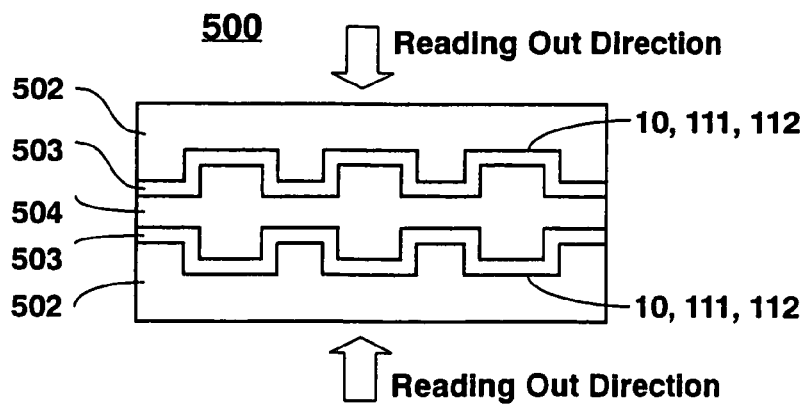
FIG. 24 is a cross sectional view of an optical disk according to a fifth embodiment of the present invention.
Figure 27:
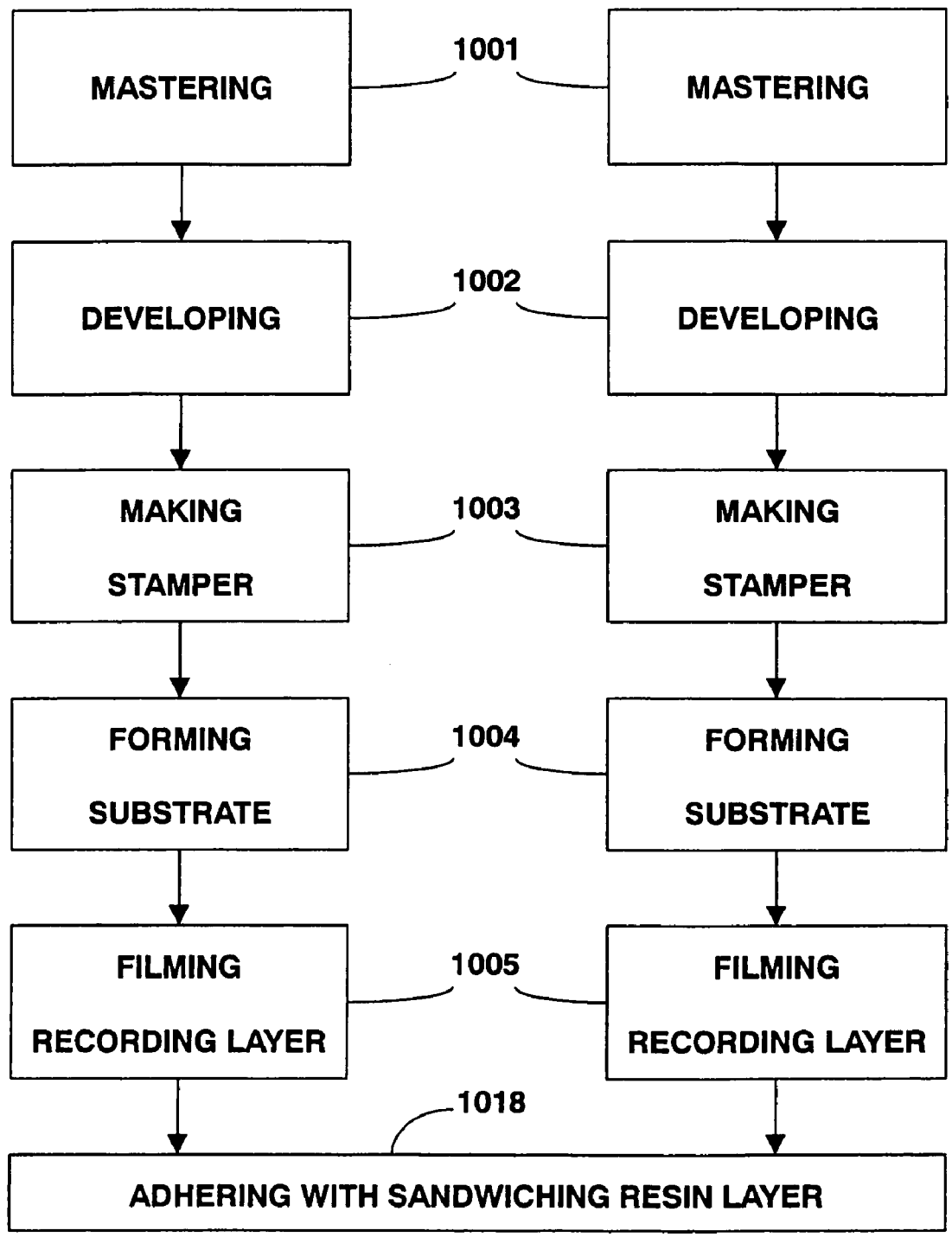
FIG. 27 is a flow chart of the manufacturing method of the optical disk according to the fifth embodiment.

FIG. 24 is a cross sectional view of an optical disk 500 according to a fifth embodiment of the present invention. As shown in FIG. 24, the optical disk 500 is a double face disk and either face of the disk can be reproduced. The optical disk 500 is manufactured in accordance with a manufacturing method shown in FIG. 27. As shown in FIG. 27, two intermediate disks composed of a substrate 502 and a recording layer 503 are produced (Step 1005). The intermediate disks are adhered together with sandwiching a resin layer 504 between them so as to face each recording layer 503 toward each other (Step 1018), and then the optical disk 500 is finally manufactured.

The first and second microscopic constructions 111 and 112 are formed on a surface of the substrate 502 with being embossed. The substrate 502 is a light path of a laser beam as far as the recording layer 503 and its thickness is 0.6 mm. A material of the substrate 502 is polycarbonate resin and its refractive index "n" at 650 nm is 1.58. The recording layer 503 has a laminated construction mainly composed of a phase change material, which is in a high reflectivity when not recorded and in a low reflectivity when recorded. The recording layer 503 is laminated by ZnSSiO, AgInSbTe, ZnSSiO, and AlCr in order on the substrate 502 with the sputtering method. A reflectivity of the recording layer 503 is 18 to 30%. In this construction, a recording sensitivity of the recording layer 503 at 650 nm is 7.5 to 14.0 mW. The recording layer 503 can also be recorded by a laser beam of 635 nm and its recording sensitivity can be maintained in a range of 7.0 to 13.0 mW almost a same range as that of 650 nm.

A microscopic construction while not recorded is the same configuration shown in FIG. 25. As shown in FIG. 25, the optical disk 500 comprises the first areas 411a and 411b having the first microscopic construction 111 for recording and reproducing and the second area 412 having the second microscopic construction 112 for preventing the optical disk 500 from dump copying. The first areas 411a and 411b are an area, which is engraved with the groove 11 for recording and reproducing and the address pit 13 as shown in FIG. 2. The second area 412 is another area engraved with the specific pit array 15 for preventing the optical disk 500 from dump copying and the address pit 13 as shown in FIG. 21. Actually, the optical disk 500 comprises the first area 411a, the second area 412 and the first area 411b in order from the innermost circumference area to the outermost circumference area.

The groove 11 having a width of "w" is provided spirally in the first areas 411a and 411b and its track pitch TP is 0.74 μm as same as that of a DVD-ROM disk and sinusoidally deflected. A period of the groove 11 is recorded by eight times a sync-frame frequency. Further, amplitude of a waveform of the groove 11 is arbitrarily prescribed within a range of 9 to 17 nm. Furthermore, a respective phase among adjoining tracks is determined at random for the CLV (constant linear velocity) recording. Moreover, an address pit 13 having a certain length of AL is engraved on a land allocated outer area than the groove 11 in accordance with an address value. In addition thereto, a depth of the groove 11 is a same as that of the address pit 13 and the depth is "d" respectively.

In the second area 412, the specific pit array 15 having a width of "w2" is provided spirally in a same direction of rotation as that of the first area and its track pitch TP2 is 0.74 µm as same as that of the first area and sinusoidally deflected. A period of the groove is recorded by 8 times a sync-frame frequency. Further, amplitude of a waveform of the groove is a same as that of the first area 411. Furthermore, a respective phase among adjoining tracks is determined at random for the CLV (constant linear velocity) recording. Moreover, an address pit 13 having a certain pit length of AL2 is engraved on a land allocated outer area than the specific pit array 15 in accordance with an address value as same as that of the first area. A depth of the specific pit array 15 is a same as that of the address pit 13 and the depth is "d2". In addition thereto, the specific pit array 15 is modulated by the 8-16 modulation method and its shortest pit length PL, that is, the 3T signal is 0.40 µm. Each address pit 13 is provided with the pit 15z composed of the 14T signal with being adjacent to the address pit 13.

Actual dimensions of the first and second areas for manufacturing are prescribed with $20 \leq d \leq 41$ nm, $0.35 \leq (w/0.74) \leq 0.55$ and $44 < 35AL+d < 53$. Further, for easier manufacturing, parameters are prescribed as d2=d, w2=w and AL2=AL.

An address pit 13 of the optical disk 500 manufactured as mentioned above can be read out properly from the first and second areas while the disk 500 is not recorded. Further, the first area is recorded with the microscopic construction 111 shown in FIG. 3. In other words, a 8-16 modulation signal having the shortest mark length ML of 0.40 µm is recorded in the groove 11 as a recording mark 14. In this case, readability of the address pit 13 is excellent. In addition thereto, the recording mark 14 can be reproduced properly.

According to an aspect of the present invention, there provided an optical information recording medium, which is realized as an optical disk for high density recording by utilizing a phase change recording layer having reflectivity of more than 15% together with an address pit, which is recorded on a land with being scattered. Particularly, such a disk having an address pit output in accordance with the present invention can minimize relative interference between a recording mark provided in a groove and an address pit signal and can be recorded and reproduced excellently. Further, dimensions of microscopic construction of a disk substrate are specified, so that stable manufacturing and supplying of a disk can be maintained.

According to another aspect of the present invention, there provided an optical information recording medium, which is a high density phase change type optical recording disk having a recording/reproducing area recorded with an address pit with scattered on a land and having another area recorded with a pit array for preventing the disk from illegal copying and a scattered address signal together. Further, by prescribing an aperture ratio of an address signal within a specific range, the disk can be read out in a low error rate. Furthermore, in order to realize the readout in a low error rate, a microscopic construction of a disk substrate is specified by dimensions. Accordingly, stable manufacturing and supplying of a disk can be assured.

What is claimed is:

1. An optical information recording medium comprising:
   a substrate formed with an area having sinusoidally deflected grooves and address pits scattered and allocated between said grooves;
   a recording layer having reflectivity of more than 15%; and
   an adhesive layer formed over said recording layer,
   said optical information recording medium is further characterized in that an output value of address pit as a signal component of address pit occupying in a reproduced signal under a not recorded condition in said area is within a range of 0.18 to 0.27.

2. A reproducing method for reproducing an optical information recording medium, said optical information recording medium comprising:
   a substrate formed with an area having sinusoidally deflected grooves and address pits scattered and allocated between said grooves;
   a recording layer having reflectivity of more than 15%; and
   an adhesive layer formed over said recording layer,
   said optical information recording medium is further characterized in that an output value of address pit as a signal component of address pit occupying in a reproduced signal under a not recorded condition in said area is within a range of 0.18 to 0.27,
   wherein said reproducing method reproduces an optical information recording medium by irradiating a laser beam stopped down by an objective lens on said recording layer.

3. The reproducing method for reproducing an optical information recording medium in accordance with claim 2, wherein reflectivity of a recording layer is within a range of 18 to 30%.

4. The optical information recording medium in accordance with claim 1, wherein reflectivity of a recording layer is within a range of 18 to 30%.

* * * * *